US012051050B2

(12) United States Patent
Kurian et al.

(10) Patent No.: US 12,051,050 B2
(45) Date of Patent: Jul. 30, 2024

(54) ATM LEVERAGING EDGE DEVICES FOR ROUND-TRIP DATA ROUTING

(71) Applicant: Bank of America Corporation, Charlotte, NC (US)

(72) Inventors: Manu Kurian, Dallas, TX (US); Siten Sanghvi, Jersey City, NJ (US); Heather Dolan, Sarasota, FL (US); George Albero, Charlotte, NC (US); Maharaj Mukherjee, Poughkeepsie, NY (US); Kevin A. Delson, Woodland Hills, CA (US)

(73) Assignee: Bank of America Corporation, Charlotte, NC (US)

( * ) Notice: Subject to any disclaimer, the term of this patent is extended or adjusted under 35 U.S.C. 154(b) by 100 days.

(21) Appl. No.: 17/958,629

(22) Filed: Oct. 3, 2022

(65) Prior Publication Data
US 2024/0112164 A1 Apr. 4, 2024

(51) Int. Cl.
*G06Q 20/10* (2012.01)
*G06Q 20/32* (2012.01)
*G06Q 20/42* (2012.01)

(52) U.S. Cl.
CPC ....... *G06Q 20/1085* (2013.01); *G06Q 20/325* (2013.01); *G06Q 20/327* (2013.01); *G06Q 20/42* (2013.01)

(58) Field of Classification Search
CPC .. G06Q 20/42; G06Q 20/325; G06Q 20/1085; G06Q 20/3278; G06Q 20/4016; G06Q 40/00

(Continued)

(56) References Cited

U.S. PATENT DOCUMENTS 8,078,518 B2 * 12/2011 Goertz ................... G06Q 40/00
705/38
8,185,457 B1 * 5/2012 Bear ...................... G06Q 40/02
705/37

(Continued)

FOREIGN PATENT DOCUMENTS

WO WO2019/220310 11/2019

OTHER PUBLICATIONS

Solomon et al., Design of a Customer-Centric Surveillance System for ATM Banking Transactions Using Remote Certification Technique, Feb. 23, 21, 2020 IEEE 2$^{nd}$ International Conference on Cyberspace, pp. 104-111 (Year: 2021).

*Primary Examiner* — Hani M Kazimi
*Assistant Examiner* — Sanjeev Malhotra
(74) *Attorney, Agent, or Firm* — Weiss & Arons LLP

(57) ABSTRACT

A method using one or more mobile devices for transporting information from an automated teller machine ("ATM") to a central server when the ATM does not support a network connection and, upon return of the one or more mobile devices to the ATM, updating the ATM may be provided. The method may include transporting electronic transaction data processed locally at the ATM, via a mobile device, to a location where a network connection between the mobile device and the central server may be established. When in a location including network connection, the method may include transmitting the electronic transaction data to the central server. When the mobile device is detected to have returned to be within the pre-determined range of the ATM, the method may include transmitting a data packet to the ATM, the data packet received from the central server, thereby updating the ATM of the transmittal.

20 Claims, 13 Drawing Sheets

(58) Field of Classification Search
USPC ...... 705/37, 38, 41, 67; 235/379; 455/456.1;
707/E17.031; 382/137
See application file for complete search history.

(56) References Cited

U.S. PATENT DOCUMENTS

| | | | | |
|---|---|---|---|---|
| 8,281,985 | B1* | 10/2012 | Steinmetz | G06Q 20/1085 235/379 |
| 8,548,904 | B1* | 10/2013 | Bear | G06Q 30/0185 705/38 |
| 8,996,613 | B2 | 3/2015 | Fan | |
| 10,467,604 | B1* | 11/2019 | Dorsch | G07F 19/20 |
| 11,526,865 | B2* | 12/2022 | Goodman | G06Q 20/3825 |
| 2007/0288382 | A1* | 12/2007 | Narayanan | G06Q 20/042 382/137 |
| 2010/0280871 | A1* | 11/2010 | Goertz | G06Q 20/407 707/E17.031 |
| 2011/0202466 | A1* | 8/2011 | Carter | H04W 4/023 705/67 |
| 2012/0196586 | A1 | 8/2012 | Grigg et al. | |
| 2012/0208557 | A1* | 8/2012 | Carter | G01S 19/23 455/456.1 |
| 2014/0324689 | A1* | 10/2014 | Pinault | G06Q 20/3223 705/41 |
| 2016/0098700 | A1 | 4/2016 | Johnson et al. | |
| 2016/0180307 | A1 | 6/2016 | Laracey | |
| 2017/0053252 | A1* | 2/2017 | Votaw | G06Q 20/40145 |
| 2017/0262844 | A1 | 9/2017 | Laracey | |
| 2017/0344962 | A1 | 11/2017 | Agrawal et al. | |
| 2018/0068297 | A1* | 3/2018 | Goodman | G06Q 20/401 |
| 2019/0087817 | A1* | 3/2019 | Adari | G06Q 20/351 |
| 2019/0140935 | A1* | 5/2019 | Kikinis | G06F 30/20 |
| 2019/0180259 | A1* | 6/2019 | Deluca | G01S 19/13 |
| 2019/0347631 | A1 | 11/2019 | Mossoba et al. | |
| 2020/0175488 | A1* | 6/2020 | Kulpati | G06Q 20/386 |
| 2020/0186355 | A1* | 6/2020 | Davies | H04L 63/123 |
| 2020/0394626 | A1* | 12/2020 | Kikinis | G06Q 20/223 |
| 2021/0073804 | A1* | 3/2021 | Kikinis | G06Q 20/3276 |
| 2021/0224813 | A1* | 7/2021 | Post | G06K 7/087 |
| 2021/0304165 | A1* | 9/2021 | Deluca | G06Q 20/3224 |
| 2021/0409956 | A1* | 12/2021 | Wagner | H04W 4/02 |
| 2022/0277306 | A1* | 9/2022 | Levitt | G06Q 20/4014 |
| 2023/0028324 | A1* | 1/2023 | Kikinis | G06Q 20/381 |
| 2023/0297998 | A1* | 9/2023 | Yang | G06Q 20/40145 235/379 |
| 2023/0306430 | A1* | 9/2023 | Post | G06Q 20/4015 |
| 2023/0319664 | A1 | 10/2023 | Arora et al. | |
| 2024/0013190 | A1 | 1/2024 | Dolan et al. | |
| 2024/0054464 | A1 | 2/2024 | Kurian et al. | |

\* cited by examiner

ATM LEVERAGING EDGE DEVICES FOR ROUND-TRIP DATA ROUTING

FIELD OF TECHNOLOGY

Aspects of the disclosure relate to facilitating communication between an ATM and a central server leveraging edge devices.

BACKGROUND OF THE DISCLOSURE

An automated teller machine ("ATM") is used widely by customers associated with an entity of the ATM for performing basic transactions. Customers may be enabled to view account information and perform transactions and withdrawals at the ATM.

The ATM typically is in direct communication with a central server when performing each transaction. However, sporadic loss of network connection does occur and the ATM may not be able to connect to the central server to process and complete transactions. It would be desirable, therefore, for the ATM to store account data of customers of a financial entity that is associated with the ATM within a local data repository at the ATM, and to continually retrieve account data from the central server keeping the locally stored customer database updated.

In addition, when users attempt to perform a transaction at the ATM and network connection is not established, it would be further desirable to enable the ATM to process these transactions locally at the ATM, update the account data stored locally and store the processed transactions pending a re-establishment of network connection.

Because, in certain circumstance, network connection between the ATM and the central server may be disconnected for longer than a few moments, it would be further desirable to enable an alternative data routing pathway for transporting of transactions to the central server.

It would be further desirable to leverage these edge devices to update the ATM of the transmission.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
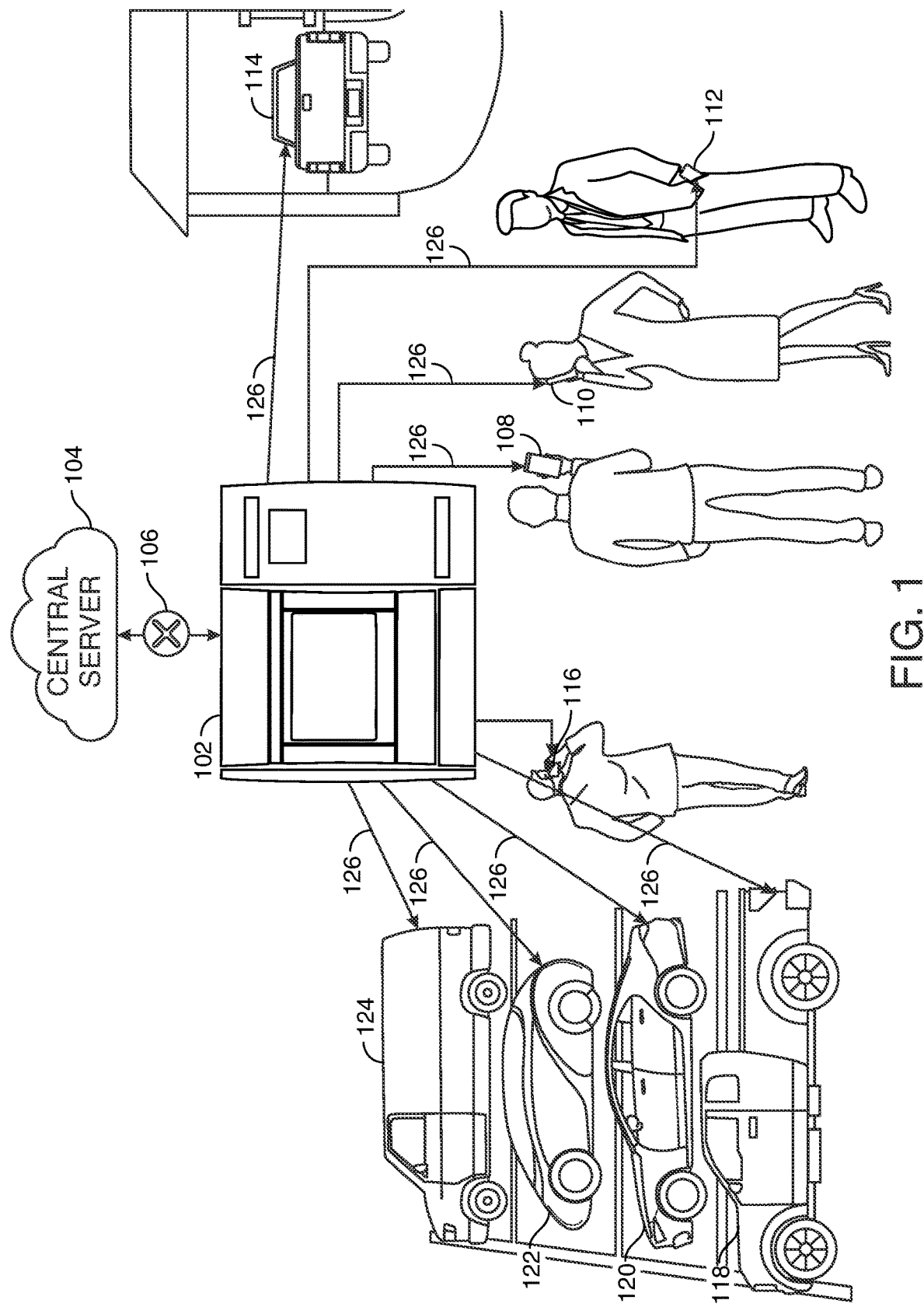
FIG. 1 shows an illustrative system architecture in accordance with principles of the disclosure.

A method using one or more mobile devices for transporting information from an automated teller machine ("ATM") to a central server is provided. The method may be implemented when the ATM does not support a network connection. The method may further use one or more mobile devices for, upon return of the one or more mobile devices to the ATM, updating the ATM.

The network connection at an ATM, in certain circumstances, may be disconnected or disrupted. Network connection may be an internet connection. The network connection may be disrupted due to weather conditions. The network connection may be disrupted due to construction, technological issues or any other suitable disruption.

While network connection between the ATM and the central server may be disrupted, a network connection between the ATM and the mobile device may also be disrupted. When network connection is not supported, a short-range network communication may be enabled to be established between the ATM and one or more mobile devices to facilitate processing of the transactions.

When network connection is not supported at the ATM, methods disclosed herein may enable transactions to be executed at the ATM despite a lack of network connection.

The method may include a processor on a mobile device executing the steps of receiving a communication request from the ATM. The communication request may be received via a short-range wireless communication. The short-range wireless communication may include one of Bluetooth®, near-field communication ("NFC"), ZigBee®, light-fidelity ("Lifi"), LoRa WAN and/or any other suitable short-range communication.

The communication request may be received when the mobile device is within a pre-determined range of the ATM. The pre-determined range may be a range enabling any one of the short-range wireless communication options.

The communication request may include a request from the ATM to connect electronically with the mobile device. The method may further include the mobile device authenticating the communication request.

The method may also include, following authenticating the communication request, confirming a first request received from the ATM. The first request may be a request for determining whether a secure application associated with an entity of the ATM is running on the mobile device. The secure application may be an application that provides access to a service associated with the entity.

The method may include receiving a second request from the ATM. The second request may be a request for approval to perform as a transaction transportation intermediary. The mobile device may be enabled to operate as a mediator for transporting electronic transaction data generated at the ATM to the central server when the ATM is not enabled to connect to the central server. The mobile device may further be enabled to operate as the mediator for updating the ATM of the transmission of the transaction data to the central server. The updating may be performed following the transporting and transmitted of the transaction data to the central server.

The second request may be received via the secure application. In some embodiments, the method may include receiving a notification on a user interface ("UI") of the mobile device. The notification may include a display of a selectable option to accept or deny the request for approval. The method may further include a user of the mobile device selecting one of the selectable options.

In the event that the user selects the option to deny the request, the method may include terminating the communicating between the ATM and the mobile device.

When the user selects the option to accept the request for approval, the method may include authorizing, via the secure application, the second request.

In response to the authorizing, the method may include receiving a batch file from the ATM. The batch file may be generated by the ATM. A copy of the batch file may be stored within a local data repository at the ATM.

The batch file may include transaction data associated with electronic transactions processed at the ATM while network connection is not supported. Electronic transactions may include one or more of deposits, withdrawals, transfers and any other suitable transaction performed at an ATM.

The batch file may also include a batch file identifier. The batch file may also include a device identifier associated with the mobile device transporting the batch file. The device identifier may be a MAC address of the mobile device. The device identifier may be a registered name of the mobile device. The device identifier may be any suitable identifier that is unique to the mobile device.

This device identifier may enable the central server, upon receipt of the offline transaction data, to determine whether the offline transaction data is new or is a duplicate.

Following a receipt of the batch file at the mobile device, the method may include storing the batch file at the mobile device.

The method may further include, the mobile device reaching an area where a network connection between the mobile device and the central server is available. The mobile device may reach the area within a few seconds or minutes following a departure from the pre-determined range of the ATM. The mobile device, in some embodiments, may reach the area a few hours later or even a day or two later.

The mobile device may be configured to detect when network connection is available and trigger the uploading of the batch file to the central server. The mobile device may be performing these actions automatically via the secure application.

It should be appreciated that the secure application on the mobile device may be monitoring and tracking the actions performed between the mobile device and the ATM and between the mobile device and the central server. When the mobile device is not enabled to connect to the secure application because of issues related to network connection, the secure application may include a local copy stored at the mobile device and may be enabled to track the actions. When network connection is restored, the data may be synchronized with the secure application.

The method may further include establishing a network connection between the mobile device and the central server at the area where network connection is supported.

During a duration of time that the mobile device is connected to the central server the method may include transmitting the batch file to the central server. The method may also include receiving, at the mobile device, from the central server, a data packet. The data packet may include the batch file identifier, a timestamp of transmission of the batch file to the central server and a status of a processing of each of the transaction data received at the central server.

The status of the processing of the batch file at the central server may include a status of an execution of each of the transaction data. The status may include a status of a storing of each of the transaction data. The status may include a status of an account update associated with each of the transaction data. The status may include a status of a determination whether the batch file is a duplicate batch file already received from the ATM in an event that the ATM establishes the network connection prior to the transmittal of the batch file from the mobile device to the central server.

Following a receipt of the data packet at the mobile device, the method may include storing the data packet at the mobile device.

In response to a detection of a return of the mobile device to the pre-determined range of the ATM, the method may include updating the ATM of the transportation of the batch file to the central server. The mobile device may communicate via short-range communication. In the event that network communication is restored at the location of the ATM, the mobile device and the ATM may be enabled to communicate using the network communication.

The mobile device may return to the pre-determined range in passing. The secure application may detect that the mobile device is nearing the ATM and may transmit an alert to the user of the mobile device. The alert may notify the user that an ATM is nearby. The user may, at that point, route the mobile device to a location within the pre-determined range of the ATM to enable transmitting the data packet to the ATM.

In some embodiments, the mobile device may return to the pre-determined range to perform another transaction. When the mobile device returns to the pre-determined range to perform another transaction, the data packet may automatically be transmitted to the ATM.

In some embodiments, the mobile device may return to the pre-determined range, deliberately via the user of the mobile device, in order to update the ATM. When the mobile device is within the pre-determined range, the data packet may automatically be transmitted to the ATM. Additionally, the user may manually select an option displayed on the UI of the secure application to upload the data packet to the ATM.

The updating may include transmitting the data packet to the ATM. The updating may further include receiving confirmation from the ATM of a receival of the data packet. The updating may also include, following a receipt of the confirmation, deleting the data packet and the batch file from the mobile device.

Following a transmittal of the data packet from the mobile device to the ATM, the method may include the ATM performing the steps of receiving the data packet from the mobile device. The method may further include, the ATM performing the step of searching in a local data repository at the ATM for a copy of the batch file comprising the batch file identifier and the device identifier identified in the data packet.

When the batch file is transmitted to the mobile device, a copy of the batch file may also be stored at the local data repository. The copy of the batch file may be stored until the ATM is notified that the batch file has been uploaded by a mobile device. In some embodiments, the copy of the batch file may be stored until the ATM may be enabled to establish a network connection with the central server and upload the copy of the batch file.

In response to an identification of the copy of the batch file comprising the batch file identifier and the device identifier, the method may include the ATM performing the steps of tagging to the copy of the batch file, a status equal to completed.

The method may further include the ATM performing the steps of removing the copy of the batch file from a queue. The queue may include one or more batch files that are pending. These one or more batch files that are pending may be batch files generated while network connection has not been established at the ATM and are awaiting re-establishment of network connection to enable transporting to the central server.

Following a removal of the copy of the batch file from the queue, the method may include the ATM performing the steps of, deleting the copy of the batch file from the local data repository.

In some embodiments, the copy of the batch file may not be removed from the queue until a network connection between the ATM and the central server is supported and the ATM can confirm successful completion of the processing of all the transaction data included in the batch file.

In some embodiments, prior to storing the batch file at the mobile device, the method may include determining, by the mobile device, a size of the batch file. The mobile device may further determine an amount of available storage at the mobile device. When the amount of available storage at the mobile device is equal to or greater than the size of the batch file, the method may include storing the batch file at the mobile device.

When the amount of available storage at the mobile device is less than the size of the batch file, the method may include the mobile device deleting the batch file from the mobile device. Following a deletion, the method may include the mobile device transmitting to the ATM a notification of insufficient storage space. The method may also include the mobile device transmitting to the ATM the amount of available storage at the mobile device.

In response to a receipt of the notification at the ATM, the method may include the ATM performing the steps of splitting the batch file into a first partial batch file and a second partial batch file. It should be appreciated that a size of the first partial batch file may preferably be no greater than the amount of available storage on the mobile device.

In some embodiments the ATM may split the batch file into three of more batch files, based on the size of the batch file and further based on the size of the mobile device and the additional mobile device.

The first partial batch file may include a first portion of the transaction data from the batch file, a first partial batch file identifier and the device identifier associated with the mobile device.

The first partial batch file may also be stored at the local data repository.

The method may further include receiving at the mobile device the first partial batch file. The method may also include receiving at an additional mobile device within the pre-determined range of the ATM, a second partial batch file. The second partial batch file may include a remaining portion of the transaction data from the batch file, a second partial batch file identifier and a device identifier associated with the additional mobile device.

Following a storing of the first partial batch file at the mobile device, the method may include reaching the area where a network connection between the mobile device and the central server is available. The method may further include establishing the network connection between the mobile device and the central server.

The method may further include, during a duration of time that the mobile device is connected to the central server, transmitting the first partial batch file to the central server. The method may also include, during the duration of time that the mobile device is connected to the central server, receiving, at the mobile device, from the central server, a first data packet comprising the first partial batch file identifier, a timestamp of transmission of the first partial batch file to the central server and a status of a processing of each of the transaction data received at the central server.

The method may further include storing the first data packet at the mobile device. In response to a detection of a return of the mobile device to the pre-determined range of the ATM, the method may include updating the ATM by transmitting the first data packet to the ATM. The updating may further include receiving confirmation from the ATM of a receival of the first data packet. Following a receipt of confirmation, the method may include deleting the first data packet and the first partial batch file from the mobile device.

Following a receipt of the second partial batch file at the additional mobile device, the method may include reaching the area where a network connection between the additional mobile device and the central server is available. The method may further include establishing the network connection between the additional mobile device and the central server.

The method may further include during a duration of time that the additional mobile device is connected to the central server, transmitting the second partial batch file to the central server.

The method may further include, during the duration of time, receiving, at the mobile device, from the central server, a second data packet comprising the second partial batch file identifier, a timestamp of transmission of the second partial batch file to the central server and a status of a processing of each of the transaction data received at the central server.

Following receipt of the second data packet at the additional mobile device, the method may include storing the second data packet at the mobile device.

In response to a detection of a return of the additional mobile device to the pre-determined range of the ATM, the method may include updating the ATM. The updating may include transmitting the second data packet to the ATM. The updating may also include receiving confirmation from the ATM of a receival of the second data packet. The updating may further include, following a receipt of confirmation, deleting the second data packet and the second partial batch file from the additional mobile device.

In some embodiments, a mobile device for transporting information from an automated teller machine ("ATM") to a central server is provided. The mobile device may be configured for transporting information when the ATM does not support a network connection. The mobile device may be further configured for, upon return of the mobile device to the ATM, updating the ATM of the transport.

The mobile device may be a smart device that may be enabled to store data and be transportable to various locations. The mobile device may be one of a smartphone, a smart glasses, a smart car, a smart card or any other suitable mobile device.

The mobile device may include a secure application running on the mobile device. The secure application may be associated with an entity of the ATM. The secure application may be enabled to receive data and communications from the ATM to enable the transporting of the batch file to the central server.

The mobile device may include a local data repository. The local data repository may be configured for storing transaction data and any other suitable data received from the ATM and associated with the batch files being transmitted to the central server. The local data repository may also be configured to store data associated with data being received from the central server.

The mobile device may also include short-range wireless communication capabilities. The short-range wireless communication capabilities may include hardware embedded in the mobile device to enable the short-range communication. The mobile device may include an internal SIM/E-SIM card. The mobile device may include hardware and/or software that may enable using Bluetooth. The mobile device may include a Lifi transmitter and/or receiver or any other suitable hardware and software for enabling Lifi communication. The mobile device may include NFC hardware. The mobile device may include any other suitable short-range wireless communication hardware and/or software that enables the short-range communication.

The mobile device may also be configured for connecting to the internet. The mobile device may include wireless fidelity ("Wifi") technology embedded in the mobile device.

The mobile device may also include a UI for enabling communication between the mobile device and the ATM and between the mobile device and the central server.

When the mobile device is within a pre-determined range of the ATM and network connection is not supported within the pre-determined range of the ATM, the mobile device may be configured to receive, from the ATM, a batch file. The batch file may include transaction data associated with a plurality of transactions performed at the ATM while the network connection is not supported. The batch file may also include a batch file identifier, and a device identifier associated with the mobile device receiving the batch file.

It should be appreciated that the batch file received from the ATM may be an encrypted batch file which enables all transaction data included in the batch file to be secured. A user of the mobile device transporting the data may not be able to access or view the transaction data.

The mobile device may be further configured store, the batch file at the mobile device, pending transmittal of the batch file to the central server.

The mobile device may depart from the location of the ATM. The mobile device may attempt to establish a network connection in different locations. The mobile device may leveraging Beacon signals, radio waves, Lifi signals, or any other suitable method of transmitting electronic messages to when attempting to connect.

When the mobile device is in a location where a network connection between the mobile device and the central server is supported, the mobile device may be configured to establish a network connection between the mobile device and the central server. The mobile device may be further configured to transmit the batch file to the central server.

Following a receipt of the batch file at the central server, the mobile device may be configured to receive, from the central server, a data packet. The data packet may include the batch file identifier, a timestamp of transmission of the batch file to the central server and a status of an execution of each of the transaction data received at the central server.

The mobile device may also be configured to store the data packet at the mobile device.

When the mobile device is detected to be within the pre-determined range of the ATM following transmittal of the batch file to the central server, the mobile device may be configured to transmit the data packet to the ATM. The mobile device may be further configured to receive confirmation from the ATM of a receival of the data packet. The confirmation to the mobile device may further confirm that the ATM identifies the batch file associated with the data packet and the batch file may be deleted from storage at the mobile device.

Following a receipt of confirmation, the mobile device may be configured to delete the data packet and the batch file from the mobile device. The batch file may be stored at the mobile device until confirmation of receipt of the data packet.

Maintaining storage of the batch file at the mobile device even after the batch file has been transported and transmitted to the central server enables keeping track of the transaction data being transported in the event that the batch file does not reach the central server. Once the mobile device returns to the ATM and transmits the data packet to the ATM, the ATM may intercede and confirm whether or not the transaction data has actually been received at the central server.

In some embodiments, when the mobile device receives the batch file, the mobile device may be configured to determine a size of the batch file. The mobile device may also be configured to determine an amount of available storage at the mobile device.

When the amount of available storage at the mobile device is equal to or greater than the size of the batch file, the mobile device may be configured to store the batch file at the mobile device.

When the amount of available storage at the mobile device is less than the size of the batch file, the mobile device may be configured to delete the batch file from the mobile device.

Following a deletion, the mobile device may be configured to transmit to the ATM a notification of insufficient storage space, and the amount of available storage at the mobile device.

Following receipt of the notification at the ATM, the ATM may be configured to split the batch file into two or more batch files based on the amount of available storage at the mobile device.

The mobile device may be configured to receive from the ATM, a first partial batch file, the first partial batch file may be a size no greater than the amount of available storage at the mobile device. The mobile device may be further configured to store the first partial batch file at the mobile device pending an establishment of a network connection to the central server.

A second partial batch file may be transmitted to an additional mobile device by the ATM. The second partial batch file may include a second batch file identifier and a second device identifier associated with the additional mobile device.

The first partial batch file and the second partial batch file may be stored at the local data repository of the ATM.

In some embodiments, prior to receipt of the batch file at the mobile device, the mobile device may be configured to receive, from the ATM, an electronic communication including a size of the batch file and a request to transmit back an amount of available storage at the mobile device.

The ATM may be configured to, upon receipt from the mobile device, of the amount of available storage, determine whether the batch file may be enabled to be transmitted to the batch file or may need to be split into two or more batch files.

A method for enabling an ATM supporting a default routing pathway, to leverage an alternative data routing pathway using edge devices for transmitting information to a central server is provided. The method may be enabled when the ATM does not support a wireless network connection. The network connection may be a wireless network connection between the ATM and the central server. In some embodiments the network connection may be an internet connection. The method may include a processor on the ATM executing the steps.

The method may include detecting a loss of network connection between the ATM and the central server. In response to a detection that the ATM does not support the network connection, the method may include processing electronic transaction requests received at the ATM using offline electronic transaction protocols.

The offline electronic transaction protocols may include authorizing the user and/or device performing the transaction. The authorizing may include receiving input of the user's password and/or biometric data and comparing it to authentication data associated with the user that may be stored within the customer account database. The customer account database is stored at the central server. Additionally, the customer account database may be stored at the ATM in a local data repository. When the network connection between the ATM and the central server is established, the ATM may continuously update the customer account database by retrieving the data from the central server.

The offline electronic transaction protocols may also include, in response to the authorizing, processing the transaction by updating the user's account and any additional account included in the transaction based on the request and storing the electronic transaction data in an offline electronic transaction file.

The method may also include storing in the local data repository, offline transaction data associated with each processed offline electronic transaction and marking a status for each offline transaction data as 'pending online.'

Each offline transaction data may include account data for the accounts associated with the transaction. Each offline transaction data may also include a transaction number, a timestamp when the request was processed, a transaction status of 'online pending' and a value of the transaction.

The local data repository within the ATM may include a customer account database. The customer account database may include account data for each customer of an entity associated with the ATM. The customer account database may include account data for any customer that uses the ATM. The processor may continuously retrieve account data for each customer from the central server and update the local customer account database.

Maintaining a customer account database at the ATM may enable the ATM to perform transactions even when network connection has been disrupted.

Each transaction that is processed when network connection is disrupted, is processed at the ATM and stored within the local data repository in a customer account database. Additionally, the customer account associated with the transactions may be updated based on the transaction processed.

The ATM may, at periodic intervals, re-attempt to establish the network connection with the central server. When network connection is re-established, electronic transactions may be directed via the default routing pathway. The default routing pathway may be the standard mode of processing electronic transactions at any ATM.

To enable processing electronic transactions received at the ATM when the network connection is disrupted, the method may process each electronic transaction received using the alternative data routing pathway.

The alternative data routing pathway may leverage one or more edge devices within close proximity to the ATM to serve as a proxy for transmitting data to the central server. The one or more edge devices may be enabled to communicate with the ATM via a short-range communication in order to receive transaction data from the ATM. Short-range communication may include one of Bluetooth®, near-field communication ("NFC"), ZigBee®, light-fidelity ("Lifi") and any other suitable short-range communication.

The one or more edge devices may be enabled to carry electronic transaction data from electronic transactions processed locally at the ATM to a location where the edge device may be enabled to establish a network connection with the central server via the secure application. When in a location where network connection may be established between the mobile device and the central server, the one or more mobile devices may transmit the electronic transaction data to the central server.

Edge devices, described herein as mobile devices, may be one of a smart card, smartphone, smartwatch, smart glasses, smart car or any other suitable edge device.

The method may include searching, using short-range wireless communication, for a mobile device within a pre-determined range of the ATM. The searching may include leveraging Beacon signals, radio waves, Lifi signals, or any other suitable method of transmitting electronic messages to mobile devices within short-range.

The method may also include, in response to an identification of the mobile device within the pre-determined range, transmitting a pairing request to the mobile device requesting the mobile device to allow the ATM to connect.

The pre-determined range may be a range within a pre-determined proximity to the ATM. The pre-determined proximity may be a distance that enables the transmitting of the batch file using short-range communication.

In response to a receipt of authentication of the request, the method may include determining if the mobile device is running a secure application on the mobile device. The secure application may be associated with an entity of the ATM. The secure application may be an application that provides access to a service associated with the entity.

When the mobile device is determined to run the secure application, the method may include requesting an approval from the mobile device to perform as a transaction transmission intermediary. When the mobile device accepts to operate as the transaction transmission intermediary, the mobile device may be the mediator for transmitting electronic transaction data generated at the ATM to be transmitted to the central server when the ATM is not enabled to connect to the central server.

The requesting of the approval may include transmitting a notification to the mobile device. The notification may include displaying a selectable option to accept or deny the request. The notification may be displayed via the secure application running on the mobile device. The notification may be displayed on a UI of the mobile device.

In some embodiments, the requesting of approval may include accessing an account profile of the user of the mobile device. The method may further include, determining, based on the setting in the account profile, whether a selectable option to pre-sign in to being the transaction transmission intermediary has been selected.

In response to a receipt of approval from the mobile device, the method may include compiling a batch file to be transmitted to the mobile device. The compiling may include determining an amount of available storage at the mobile device. In some embodiments, the amount of available storage at a mobile device may be determined based on the type of mobile device. When the mobile device is a smaller mobile device, i.e. —a smartwatch or smart card, data storage space available at the device may be minimal. When the mobile device is a larger device, i.e. —a smart car, data storage space available at the device may be much greater than the smaller mobile devices.

The method may include generating a batch file including the offline transaction data stored in the local data repository from each processed offline electronic transaction. The size of the batch file may be no greater than the amount of available storage on the mobile device. The method may include inserting each offline electronic transaction data into the batch file until there is insufficient space in the batch file. In some embodiments, the batch file may be enabled to include all offline electronic transaction data from the ATM that is waiting to be uploaded to the central server. In other embodiments, the batch file may be enabled to include a partial amount of the data due to insufficient space.

In some embodiments, when the mobile device does not have enough storage space for all the offline transaction data, the method may include, splitting the batch file into two or more batch files. One batch file may be transmitted to the mobile device. The additional two or more batch files may be transmitted to an additional one or more mobile devices identified within the pre-determined range.

The method may further include assigning a batch file identifier to the batch file.

The compiling may further include tagging to the batch file, the batch file identifier. The compiling may further include tagging to the batch file, a device identifier associated with the mobile device that may be the proxy for transmitting the offline transaction data to the central server. The device identifier may be a MAC address of the mobile device. The device identifier may be a registered name of the mobile device. The device identifier may be any suitable identifier that is unique to the mobile device. This device identifier may enable the central server, upon receipt of the offline transaction data, to determine whether the offline transaction data is new or is a duplicate.

The method may include storing a copy of the batch file at the local data repository and tagging the copy of the batch file with the device identifier and the batch file identifier.

The method may further include transmitting the batch file to the mobile device. In some embodiments, the method may include encrypting the batch file prior to transmitting to the mobile device. The encrypting of the data may ensure the secure storage, by the mobile device, of sensitive information included in the transmission.

When the ATM is enabled to re-establish network connection with the central server, the copy of the batch file may be automatically uploaded to the central server. The copy of the batch file transmitted from the ATM may be tagged with the device identifier and the batch file identifier. Thereby, when both the mobile device and the ATM upload the batch file, the central server may be enabled to make a determination of duplication based on the device identifier and the batch file identifier.

The central server may be configured to determine duplication by comparing the batch file identifier and the device identifier that is tagged to each batch file. Based on the comparison, the central server may determine whether the file is a duplicate.

In some embodiments, when compiling the batch file, offline transaction data may be inserted into the batch file in order of the value of each transaction. The transaction comprising the greatest transaction value may be the first transaction to be processed at the central server. In some embodiments, the offline transaction data may be inserted into the batch file based on the timestamp. The oldest transaction may be the first in the batch file which may enable the oldest transaction to be processed first at the central server.

In some embodiment the mobile device may deny the request for approval of operating as the transaction transmission intermediary. In response to a receipt of a denial to the request, the method may include the ATM searching for another mobile device within the pre-determined range.

In some embodiments, following the searching of the pre-determined range for one or more mobile devices to operate as the transaction transmission intermediary, the method may include identifying the mobile device and an additional one or more mobile devices within the pre-determined range. The method may further include requesting approval from the mobile device and the additional one or more mobile devices to perform as the transaction transmission intermediary.

In response to receipt of approval from the mobile devices and the additional one or more mobile devices, the method may include transmitting the batch file to the mobile device and the additional one or more mobile devices. When the same batch file is transmitted to more than one mobile device the batch file identifier may be the same identifier for each of the batch files. When the batch file is split into two or more batch files, each batch file may be assigned a different identifier. This may enable the central server accurately determining whether a batch file is a duplicate of a previously received batch file from either the ATM or another mobile device.

In some embodiments, the batch file may be the same batch file transmitted to each mobile device. In some embodiments, based on available storage at each of the mobile devices, the batch file may be split into two or more batch files.

When the size of the batch file is greater than the amount of available storage, the method may include, splitting the batch file into a first batch file and a second batch file. The method may include splitting the batch file into a first, second, third or more batch files.

The method may further include transmitting the first batch file to the mobile device. The method may further include transmitting the second batch file to the additional one or more mobile devices.

In some embodiments, the method may include identifying a first mobile device. The method may further include determining that the mobile device does not have sufficient storage for all the offline transaction data that is pending. When the mobile device does not have sufficient storage space, the method may further include searching the pre-determined range for an additional mobile device.

Following the identifying of the additional mobile device, the method may include requesting approval from the additional mobile device to perform as the transaction transmission intermediary. In response to receipt of approval from the additional mobile device, the method may include splitting the offline transaction data into two batch files. The method may include transmitting the first batch file to the mobile device and further transmitting the second batch file to the additional mobile device.

Following a transmitting of the first batch file and the second batch file to the central server when network connection is re-established, the method may include, via the central server, determining, based on the device identifier tagged to the offline transaction data, whether the batch file is a duplicate batch file.

A system for enabling an ATM supporting a default routing pathway, to leverage an alternative data routing pathway using edge devices for transmitting information to a central server when the ATM does not support a network connection is provided.

The ATM may be configured to detect a loss of the network connection between the ATM and the central server. The ATM may be further configured to process electronic transaction requests at the ATM using offline electronic transaction protocols. Following the processing of electronic transaction requests at the ATM, the ATM may be configured to store in a local data repository, offline transaction data associated with each processed offline electronic transaction.

When the ATM is not enabled to establish a network connection with the central server, the ATM may be configured to search, using short-range wireless communication, for a mobile device within a pre-determined range of the ATM. The mobile device may be enabled to provide transmission of offline electronic transaction data stored at the ATM to the central server while network connection between the ATM and the central server may not be established.

It should be appreciated that in some embodiments, the short-range wireless communication may include a bandwidth that may enable transmission of the batch file within a pre-determined amount of time.

In response to an identification of a mobile device within the pre-determined range, the ATM may be enabled to transmit a first request to the mobile device. The first request may be a pairing request. The pairing request may request the mobile device to allow the ATM to electronically communicate with the mobile device.

The mobile device may be configured to receive the pairing request. The mobile device may be further configured to transmit an electronic communication to the ATM authenticating the pairing request and further transmitting a device identifier associated with the mobile device to the ATM.

The ATM may be configured to determine whether the mobile device is running a secure application on the mobile device. The secure application may be associated with an entity of the ATM.

In response to the determination that the mobile device is running the secure application, the ATM may be configured to transmit a second request to the mobile device. The second request may be an approval request that is requesting approval from the mobile device to perform as a transaction transmission intermediary.

In response to a receipt of approval, the ATM may be configured to compile a batch file for transmitting to the mobile device.

The compiling may include determining an amount of available storage at the mobile device. The compiling may further include generating a batch file including the offline transaction data stored in the local data repository from each processed offline electronic transaction.

It should be appreciated that a size of the batch file may be no greater than the amount of available storage on the mobile device.

The ATM may assign a batch file identifier to the batch file. The ATM may be further configured to tag to the batch file, the batch file identifier and a device identifier associated with the mobile device.

The ATM may be further configured to store a copy of the batch file at the local data repository and further tagging to the copy of the batch file, the batch file identifier and the device identifier.

The ATM may be further configured to transmit the batch file to the mobile device.

Upon receipt of the batch file at the mobile device, the mobile device may be configured to temporarily store the batch file at the mobile device while network connection with the central server is not supported at the mobile device.

When in a location comprising an enablement to connect to the network, the mobile device may be configured to establish network connection with the central server, via the secure application, and transmit the batch file to the central server.

In some embodiments, following the mobile device transmitting the batch file to the central server, the mobile device may be configured to return to the pre-determined range of the ATM. The mobile device, upon return, may be configured to transmit an electronic communication to the ATM notifying the ATM of the transmission of the batch file to the central server. The ATM may be enabled, upon receipt of the electronic communication, update the local data repository. The ATM may be further enabled to synchronize the data included in the batch file.

When a user performs a transaction at the ATM, the user may utilize a mobile device to access the user's account. The mobile device may be a credit card, debit card, smartphone or any other suitable device. It should be appreciated, that in some embodiments, the smartphone and/or the card may be enabled to store sufficient data associated with the user's account at the device itself. The data may be stored from a previous action performed at the device. The data may include credit information, latest balance and a trust score. The trust score may be enabled to be established from a previous merchant tap which may enable establishing trust at the ATM when network connection may not be established between the ATM and the central server to authorize the device.

Each time the device performs a transaction at a point of sale, the device may be updated with current information and may further receive a timestamp and previously stored information may be overwritten.

When the user approaches the ATM when a network connection may not be established, the ATM may authenticate the device based on the data stored at the device and retrieve updated account balance from the device.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative diagram in accordance with principles of the disclosure. Apparatus illustrated in FIG. 1 includes an ATM 102 and a central server 104.

The apparatus illustrated in FIG. 1 also includes mobile devices positioned sufficiently close to the ATM to support short range communications with the ATM. The mobile devices may include smartphone 108, smartphone 110, smart card 112, smart car 114, smartphone 116, device 118, device 120, device 122 and device 124. Each of devices 114 and devices 118-124 may include a computing system run on a smart car or a mobile device positioned within the car, such as a laptop, iPad, tablet, a smartphone, or any other computing device.

The ATM may be configured to communicate with central server 104 via a wireless network communication. In the event that the ATM loses communication with central server 104, communication between ATM 102 and central server 104 may be unsupported.

ATM 102 may be enabled to receive transaction requests from customers that may be associated with a secure entity. Central server 104 may receive these transaction requests and process the transaction requests when electronic communication via the network is enabled.

In FIG. 1, ATM 102 does not support communication with central server 104. The network connection may not be established between the ATM and the central server, as shown at 106. In some embodiments, the network connection may not be established for a just a few seconds. In some embodiments, the network connection may not be established for a few minutes or a couple of hours. In other embodiments, the network connection may be disconnected for more than one day. Network connection may be disrupted due to a disaster occurrence. Network connection may be disrupted due to weather conditions, construction or any other suitable occurrence.

Because the ATM does not support the network connection, the default data routing pathway for processing transactions performed at the ATM may not be enabled. The default data routing pathway may be the standard mode of processing transactions at the ATM which includes direct communication with the central server to enable updating account data within the entity based on the executed transactions.

ATM 102 may proceed to attempt to process the electronic transactions using the alternative data routing pathway. In the alternative data routing pathway, ATM 102 may attempt to leverage edge devices that are within close proximity to the ATM 102 to temporarily store transaction data associated with transaction requests. When the edge devices reach a location where network connection between the edge devices and the central server may be established, the edge devices may transmit the transaction data to the central server 104 for processing.

As illustrated, ATM 102 may attempt to establish a connection with one or more edge devices. The connection may be enabled using a short-range communication, i.e. —light fidelity ("Lifi"), Bluetooth, Zigbee or any other suitable short-range communication. ATM 102 may transmit an electronic message 126 via short-range communication to smartphone 108, smartphone 110, smart card 112, device 114, smartphone 116, device 118, device 120, device 122 and device 124. The electronic messages may be transmitted in the form of a Beacon signal, radio-waves or any other suitable method.

Figure 2:
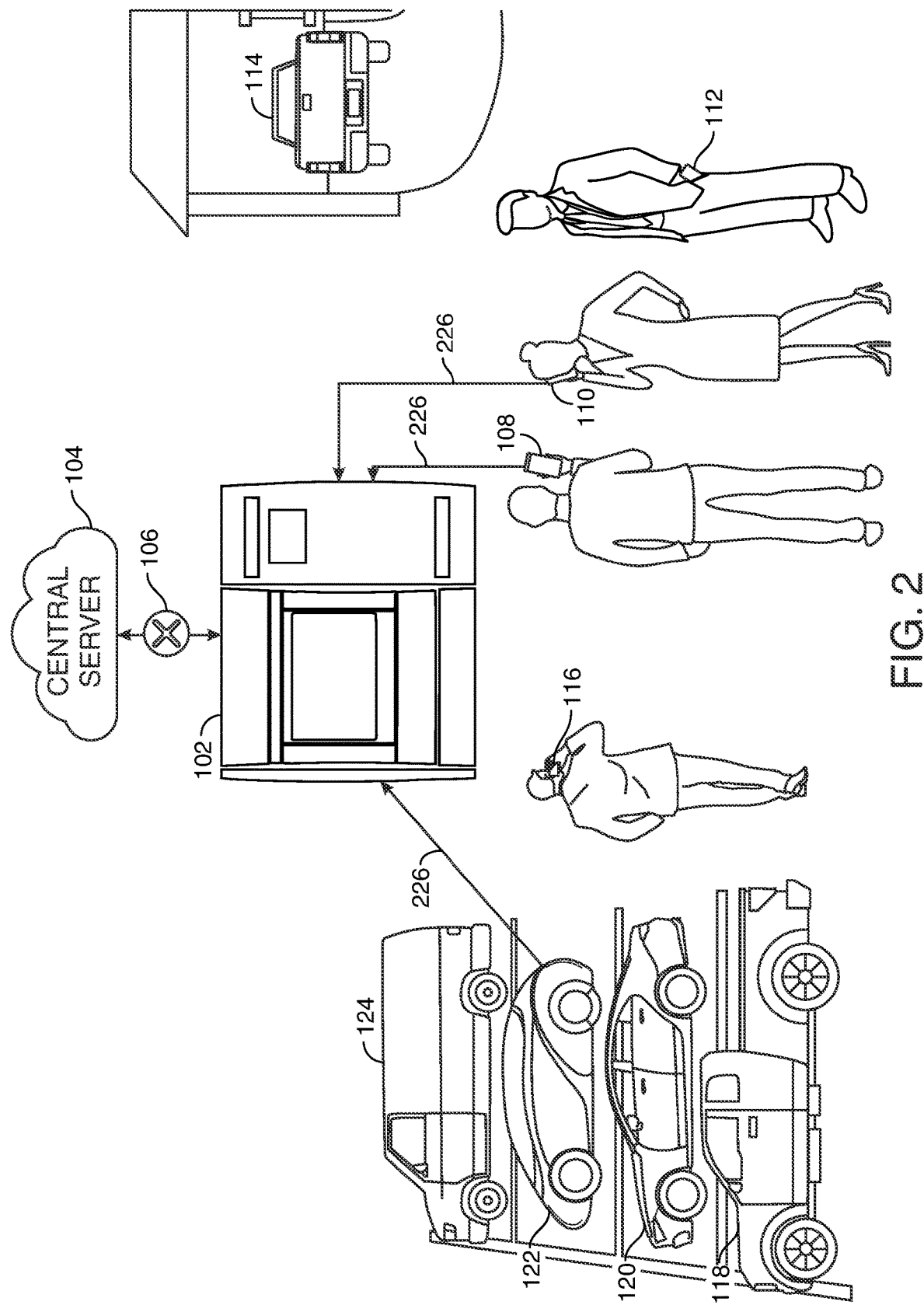
FIG. 2 shows an illustrative system architecture in accordance with principles of the disclosure.

FIG. 2 shows an illustrative diagram described above in reference to FIG. 1. In FIG. 2, smartphone 108, smartphone 110 and smart car 122 are illustrated as transmitting communications back to ATM 102, as shown at 226, in response to the short-range communication 126 illustrated in FIG. 1. As such, each of smartphone 108, smartphone 110 and smart car 122 may have successfully established electronic communication with ATM 102 using a short-range wireless network. ATM 102 may determine, based on device settings of each of devices 108, 110 and 122, whether the secure application for the secure entity is running on each of the devices. In response to the determination, ATM 102 may transmit a request to one or more of the devices that have the secure application running on the device, whether a user of the device may opt-in to enable the device to store transaction data temporarily.

Figure 3:
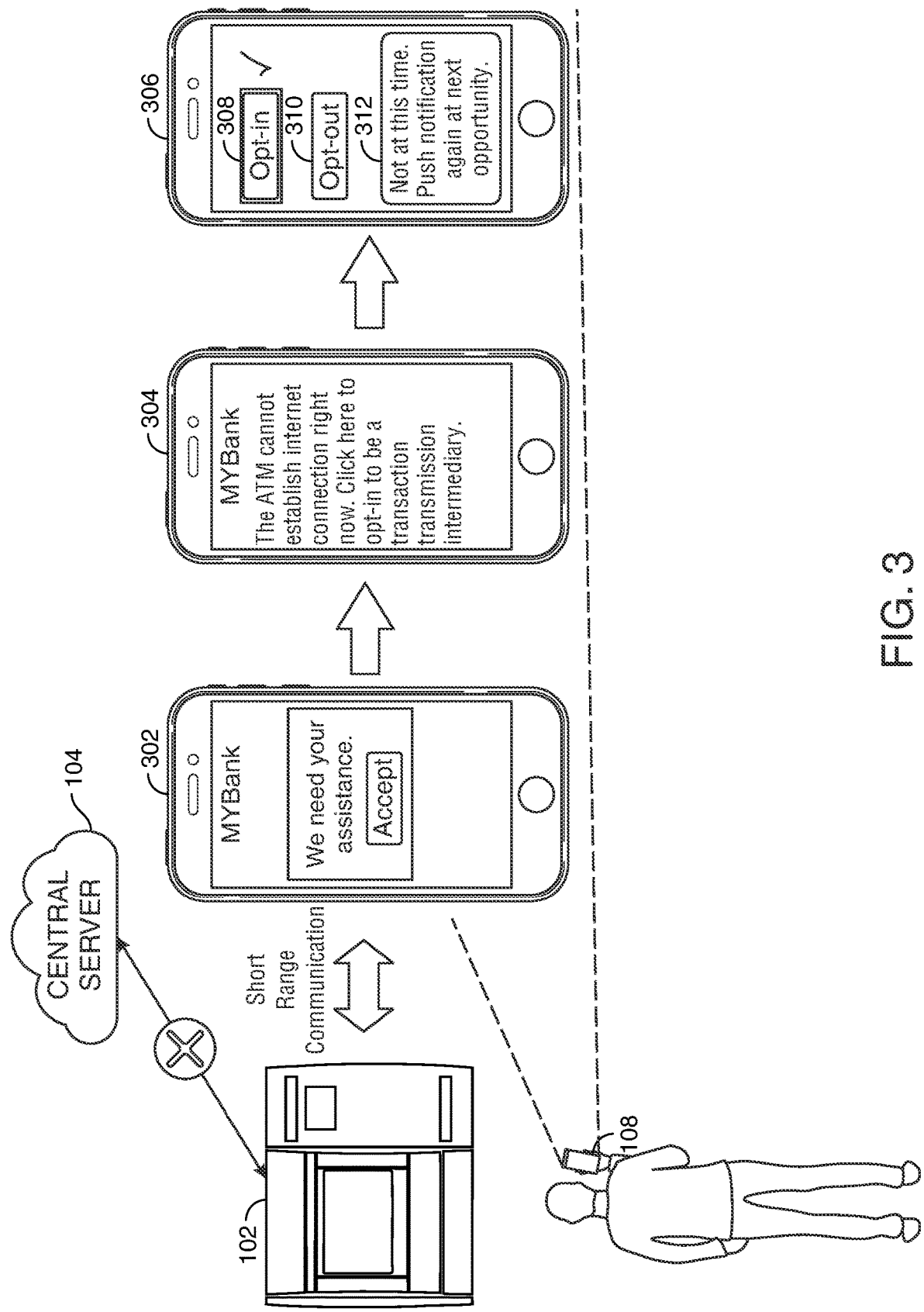
FIG. 3 shows an illustrative diagram in accordance with principles of the disclosure.

FIG. 3 shows an illustrative diagram of ATM 102 in electronic communication with smartphone 108. ATM 102 may transmit a request to smartphone 108. The request may be a request for approval from the user of smartphone 108 accepting to enable smartphone 108 to temporarily store transaction data from ATM 102 at the smartphone 108 pending re-establishment of network connection at smartphone 108.

The request may be a push notification displayed on a user interface ("UI") of smartphone 108. The request may be an email and/or text message to smartphone 108.

In this illustrative diagram, the request is transmitted as a push notification on the UI of smartphone 108. The request may be transmitted by the ATM to the secure application. The push notification may be generated by the secure application and displayed on the UI.

AT 302, the UI displays the push notification. The request is displayed within the secure application 'MyBank' interface.' The push notification displays the message 'MyBank needs your assistance.' The user of smartphone 108 may accept the push notification and view the details displayed at 304. The user of smartphone 108 may not accept the push notification and the push notification may be removed from the display after a pre-determined amount of time.

At 302, the user may select the option displayed at the UI to 'accept.' Following acceptance, UI 304 may be displayed on smartphone 108. At UI 304, the push notification displayed may display a short description for operating as the transaction transmission intermediary. Following UI 304, UI 306 may be displayed. UI 306 may display three selectable options. UI 306 may be displayed in the same display of UI 304. The first option 308, may be to opt-in to allow smartphone 108 to operate as the transaction transmission intermediary. The second option 310, may be to opt-out of the offer. The third option 312, may be to opt-out of acceptance of the request at this instance, but that the user may have an interest in the future.

At 306, selectable option 308 is selected and the smartphone is configured for receiving transaction data from the ATM 102.

Figure 4:
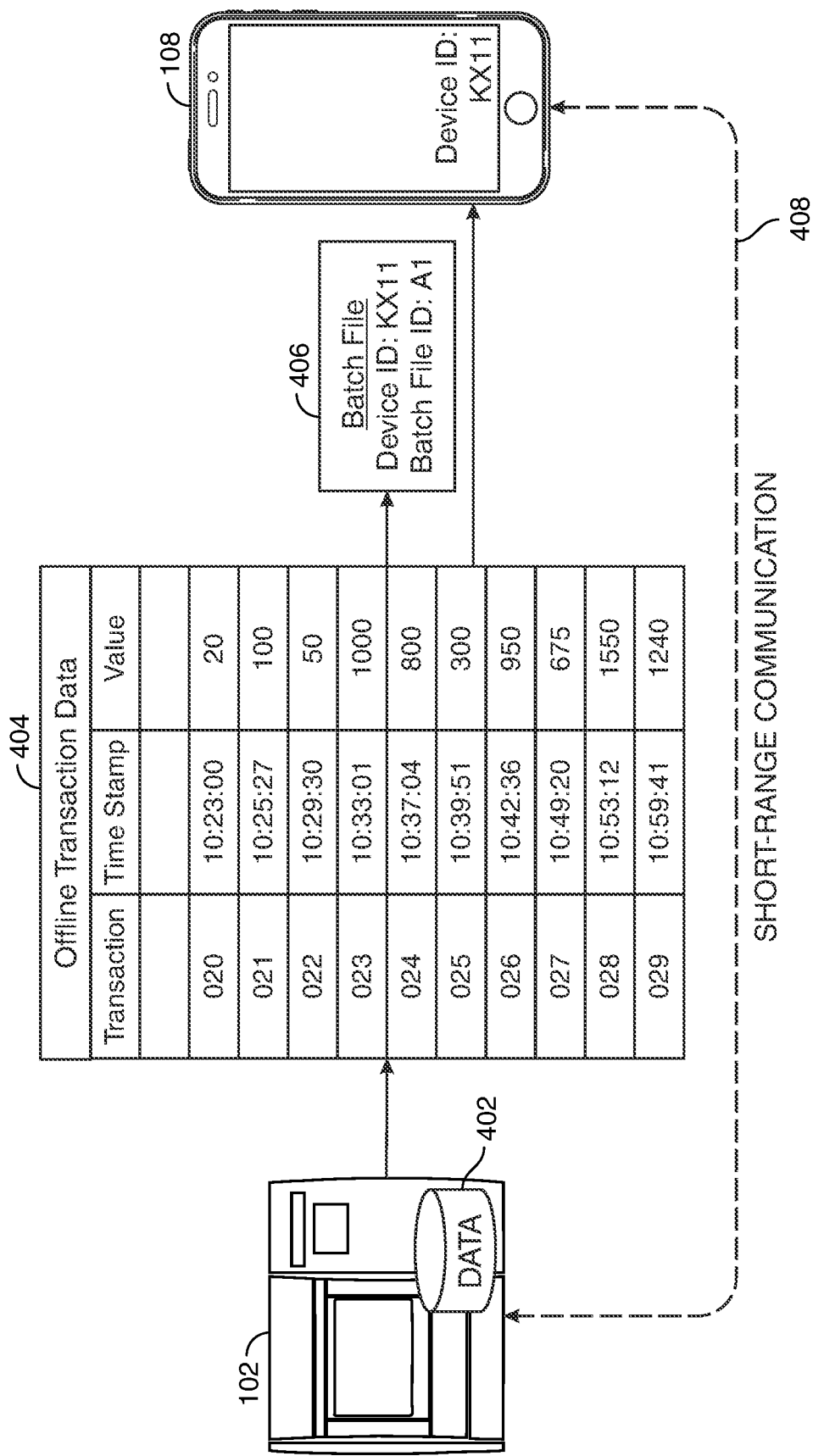
FIG. 4 shows an illustrative diagram in accordance with principles of the disclosure.

FIG. 4 shows an illustrative diagram of ATM 102 in electronic communication with smartphone 108 via short-range communication 408. The communication between ATM 102 and smartphone 108 may follow after the smartphone has been determined to opt-in to operate as the transaction transmission intermediary.

ATM 102 may retrieve offline transaction data stored in data repository 402. Offline transaction data may be data associated with each transaction request that has been received during a period of time when network connection has not been established. These transaction requests may be processed at the ATM, account data may be updated locally at the ATM and transaction data associated with each processed transaction request may be stored at data repository 402.

Each offline transaction data may include a transaction number, a timestamp of the time the transaction was executed and a value of the transaction.

ATM 102 may retrieve a device identifier associated with smartphone 108. Additionally, ATM 102 may determine the amount of available storage at smartphone 108. In the event that smartphone 108 has sufficient storage space for all offline transaction data pending for transmission to the central server, then ATM 102 may generate a batch file 406 including all offline transaction data 404. The device identifier may be tagged to the batch file.

In the event that smartphone 108 does not have sufficient storage space for all offline transaction data pending for transmission to the central server, ATM 102 may split the data and generate two or more batch files. One batch file may be transmitted to smartphone 108 and the second or more batch files may be transmitted to additional mobile devices.

In this illustrative diagram, batch file 406 may include all offline transaction data 404 that may be pending. Additionally, batch file 406 may include the device ID for smartphone 108 and a batch file identifier assigned to batch file 406.

Batch file 406 may be received at smartphone 108 and stored in memory of smartphone 108. Smartphone 108 may not be enabled to establish network connection with the central server, via the secure application while in the predetermined range of ATM 102. Smartphone 108 may store batch file 406 until the network connection may be re-established at smartphone 108 and batch file 406 may be transmitted to the central server.

Figure 5:
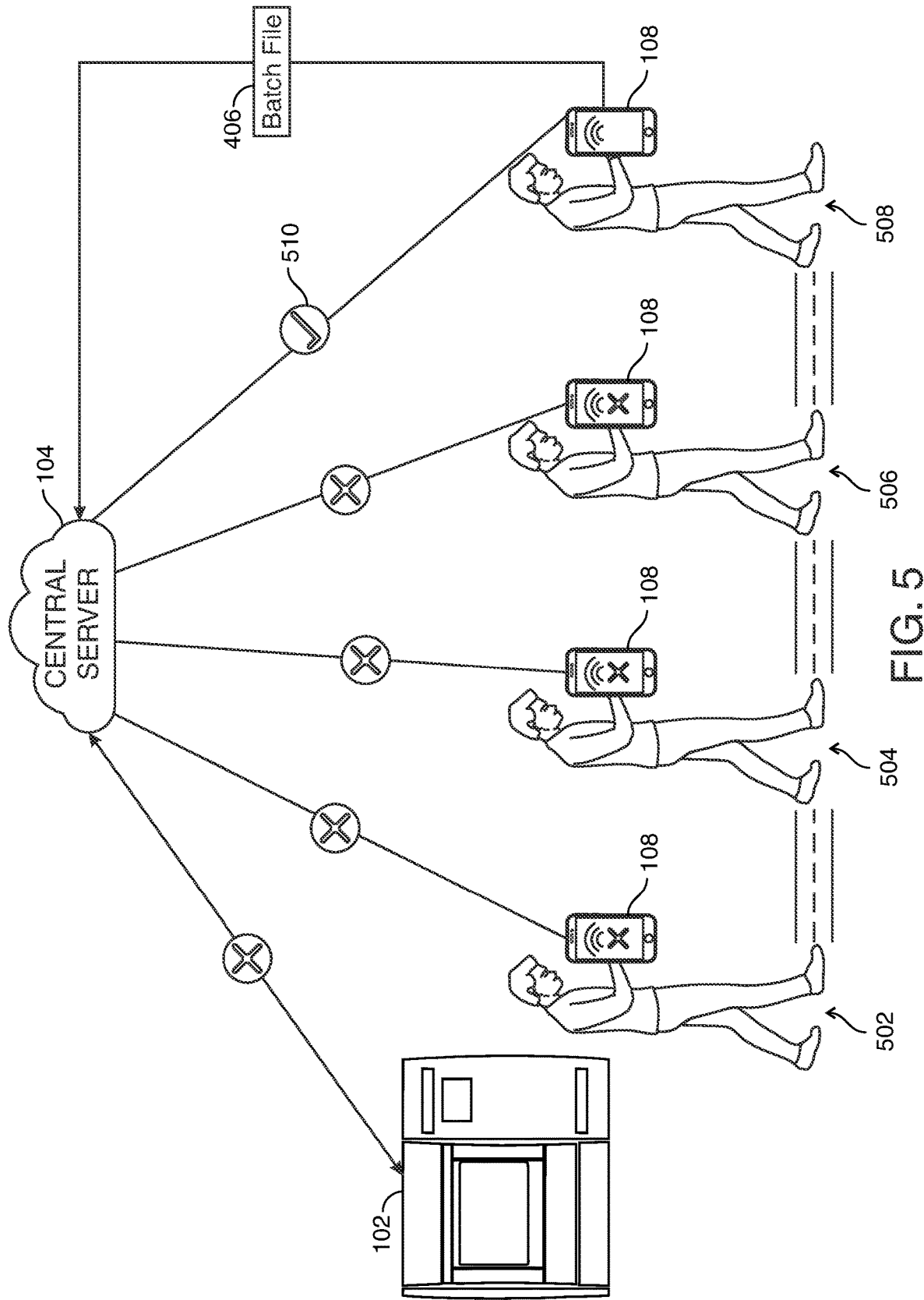
FIG. 5 shows an illustrative diagram in accordance with principles of the disclosure.

FIG. 5 shows an illustrative diagram of the process of smartphone 108 transmitting batch file 406 to the central server.

At position 502, smartphone 108 may be in close proximity to ATM 102. Network connection may not be established and ATM 102 may not be enabled to communicate with central server 104. Smartphone 108 may also not be enabled to communicate with central server 104. Because smartphone 108 is a mobile device, smartphone 108 may travel a distance away from the location of ATM 102 and reach a location where network connection may be established. When smartphone 108 reaches the location where network connection is re-established, smartphone 108 may transmit data pending at ATM 102 to central server 104 prior to ATM 102.

The distance may be a few hundred feet. The distance may be a few thousand feet. The distance may be one or more miles. The distance may be any other suitable distance.

At position 504, smartphone 108 may attempt to establish electronic communication with central server 104. Network connection may not be established at position 504 and smartphone 108 may not be enabled to communicate with central server 104.

At position 506, smartphone 108 may attempt to establish network connection with central server 104. Network connection may not be established at position 506 and smartphone 108 may not be able to communicate with central server 104.

At position 508, smartphone 108 attempts to establish connection with central server 104. Smartphone 108 may be enabled to re-establish network connection at position 508 and successfully transmit batch file 406 to central server 104.

Figure 6:
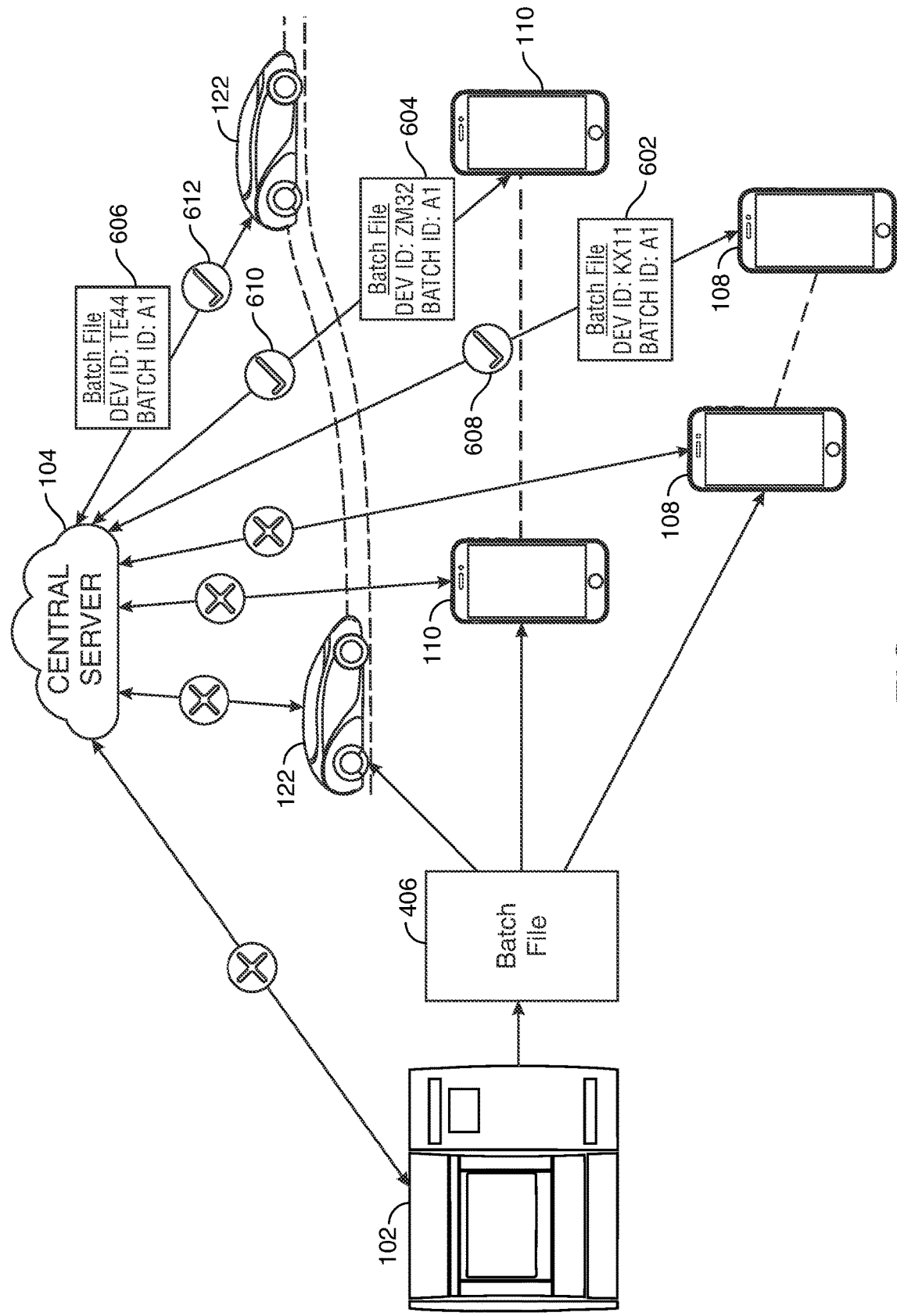
FIG. 6 shows an illustrative diagram in accordance with principles of the disclosure.

FIG. 6 shows an illustrative diagram of multiple edge devices operating as a proxy for ATM 102 for transmitting transaction data to central server 104.

Electronic communication is not available between ATM 102 and central server 104 since network connection is not able to be established.

As described in FIG. 2, smartphone 108, smartphone 110 and smart car 122 successfully established an electronic communication with ATM 102 and are each individually in electronic communication with ATM 102. Each of smartphone 108, smartphone 110 and smart car 122, may not be enabled to establish a network connection.

ATM 102 may be enabled to electronically communicate with each of smartphone 108 smartphone 110 and smart car 122 via a short-range communication because they are within close proximity to ATM 102.

ATM 102 may transmit batch file 406 to each of smartphone 108, smartphone 110 and smart car 116. Batch file 406 may be the same batch file for each of devices 108, 110 and 122. Batch file 406 may be tagged with a batch file identifier. In this exemplary diagram, batch file 406 at each device, may receive the same batch file identifier 'A1.'

A copy of batch file 406 may be stored at ATM 102. The copy of the batch file 406 may include the batch file identifier 'A1' and a device identifier of each of the mobile devices temporarily storing the batch file 406.

When batch file 406 is compiled and transmitted to smartphone 108, batch file 406 at smartphone 108 may be tagged with a device identifier associated with smartphone 108 and with the batch file identifier 'A1'.

When batch file 406 is compiled and transmitted to smartphone 110, batch file 406 at smartphone 110 may be tagged with a device identifier associated with smartphone 110 and with the batch file identifier 'A1'.

When batch file 406 is compiled and transmitted to smart car 116, batch file 406 at smart car 122 may be tagged with a device identifier associated with smart car 116 and with the batch file identifier 'A1'.

Each of smartphone 108, smartphone 110 and smart car 122 may travel a distance from ATM 102 and when in a location where network connection may be re-established, transmit the batch file to central server 104.

At a location 608, smartphone 108 successfully re-establishes network connection and batch file 602 may be transmitted to central server 104.

At a location 610, smartphone 110 successfully re-establishes network connection and batch file 604 may be transmitted to central server 104.

At a location 612, smart car 122 successfully re-establishes network connection and batch file 606 may be transmitted to central server 104.

The systems and methods described herein of generating and transmitting to two or more edge devices the same batch file may give the systems herein a robust transfer rate at least because having multiple devices carrying the same data packets may provide a greater chance that at least one of the devices will shortly connect to the central server and transmit the stored data to the central server. Methods described herein may be used by the central server to identify and remove redundant transfers if two of the two or more edge devices successfully transmit to the central serve the same batch file.

In some embodiments, ATM 102 may split batch file 406 into three batch files. A first batch file may be transmitted to smartphone 108. A second batch file may be transmitted to smartphone 110. A third batch file may be transmitted to smart car 122. In this example, each of the three batch files may receive a different batch file identifier because the data included in the batch file may not be the same.

When central server 104 receives a batch file, central server 104 may determine whether the batch file is a duplicate of a previously received batch file.

In some embodiments, smartphone 108 may reach a location of network connection prior to the smartphone 110 and smartphone 122. The first batch file may be transmitted to the central server first. When the second and/or third batch file are transmitted to the central server, the central server may determine that they are duplicates of the first batch file based on the batch file identifier.

When ATM 102 is enabled to re-establish connection to the central server prior to smartphone 108, smartphone 110 and/or smart car 122, ATM 102 may transmit the copy of the batch file 406 to the central server 104. Batch file 406 may include the batch file identifier and the device identifier of each of the mobile devices that received the batch file. Thereby, when one or more of smartphone 108, smartphone 110 and smart car 122 re-establish network connection and transmit the batch file to the central server, central server may be enabled to automatically determine whether the batch file is a duplicate based on the batch file identifier and the device identifiers.

Figure 7:
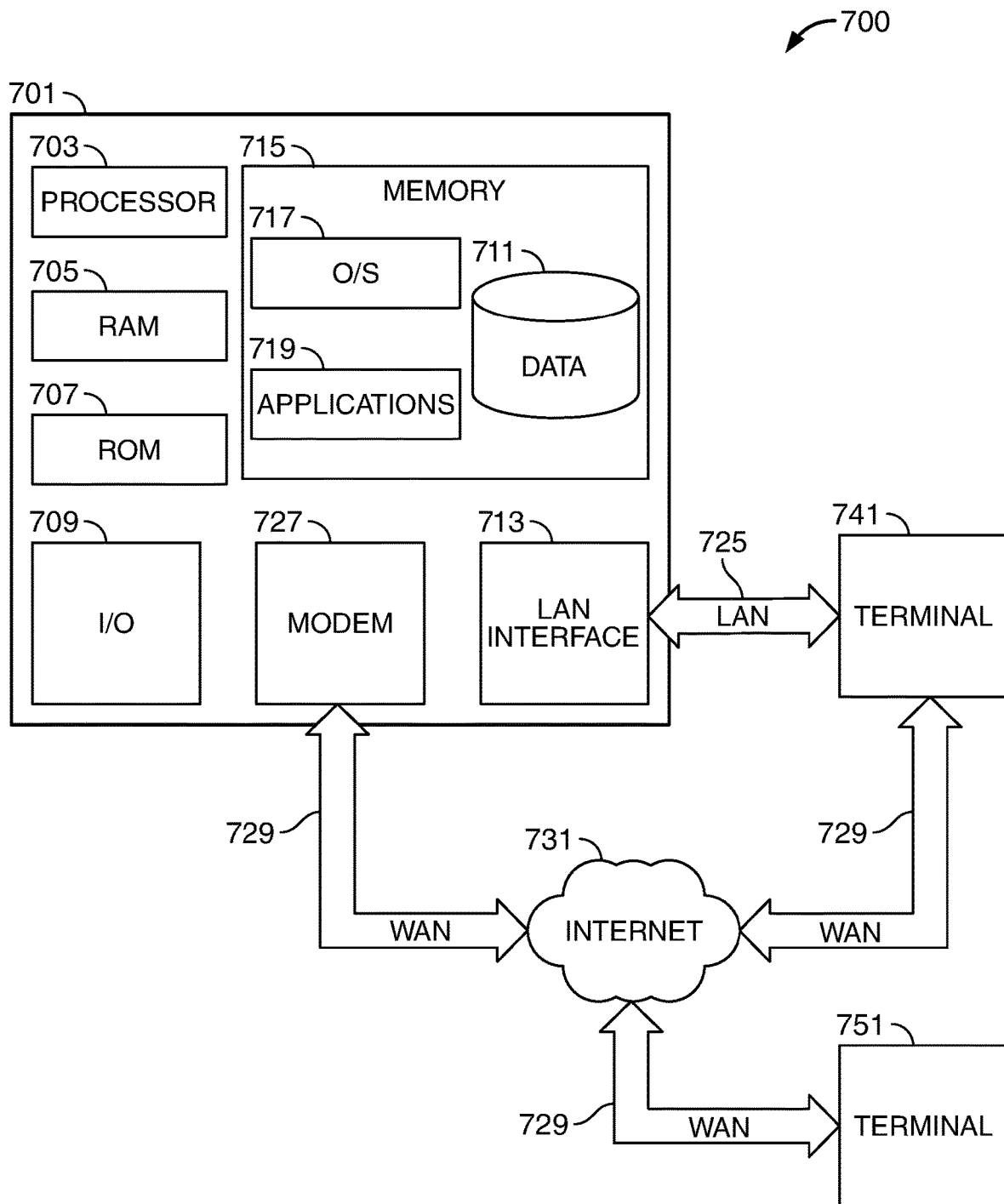
FIG. 7 shows an illustrative block diagram of apparatus in accordance with principles of the disclosure.

FIG. 7 shows an illustrative block diagram of system 700 that includes computer 701. Computer 701 may alternatively be referred to herein as an "engine," "server" or a "computing device." Computer 701 may be any computing device described herein, such as the computing devices running on the one or more of the ATM, smart phones, smart cars, smart cards and any other mobile device described herein. Elements of system 700, including computer 701, may be used to implement various aspects of the systems and methods disclosed herein.

Computer 701 may have a processor 703 for controlling the operation of the device and its associated components, and may include RAM 705, ROM 707, input/output circuit 709, and a non-transitory or non-volatile memory 715. Machine-readable memory may be configured to store information in machine-readable data structures. Other components commonly used for computers, such as EEPROM or Flash memory or any other suitable components, may also be part of the computer 701.

The memory 715 may be comprised of any suitable permanent storage technology—e.g., a hard drive. The memory 715 may store software including the operating system 617 and application(s) 719 along with any data 711 needed for the operation of computer 701. Memory 715 may also store videos, text, and/or audio assistance files. The data stored in Memory 715 may also be stored in cache memory, or any other suitable memory.

Input/output ("I/O") module 709 may include connectivity to a microphone, keyboard, touch screen, mouse, and/or stylus through which input may be provided into computer 701. The input may include input relating to cursor movement. The input/output module may also include one or more speakers for providing audio output and a video display device for providing textual, audio, audiovisual, and/or graphical output. The input and output may be related to computer application functionality.

Computer 701 may be connected to other systems via a local area network (LAN) interface 713. Computer 701 may operate in a networked environment supporting connections to one or more remote computers, such as terminals 741 and 751. Terminals 741 and 751 may be personal computers or servers that include many or all of the elements described above relative to computer 701.

In some embodiments, computer 701 may be the ATM 102 and Terminals 741 and 751 may be the central server 104, and/or any of mobile devices 108-124 that may be in electronic communication with ATM 102 via LAN, WAN or any other suitable short-range communication when network connection 631 may not be established.

When used in a LAN networking environment, computer 701 is connected to LAN 725 through a LAN interface 713 or an adapter. When used in a WAN networking environment, computer 701 may include a modem 727 or other means for establishing communications over WAN 729, such as Internet 731.

In some embodiments, computer 701 may be connected to one or more other systems via a short-range communication network (not shown). In these embodiments, computer 701 may communicate with one or more other terminals 741 and 751, such as the mobile devices including mobile devices 108-124 described herein etc., using a PAN such as Bluetooth NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking functionality related to communication, such as e-mail, Short Message Service (SMS), and voice input and speech recognition applications. Application program(s) 719 (which may be alternatively referred to herein as "plugins," "applications," or "apps") may include computer executable instructions for invoking functionality related to performing various tasks. Application programs 719 may utilize one or more algorithms that process received executable instructions, perform power management routines or other suitable tasks.

Application program(s) 719 may include computer executable instructions (alternatively referred to as "programs"). The computer executable instructions may be embodied in hardware or firmware (not shown). The computer 701 may execute the instructions embodied by the application program(s) 719 to perform various functions.

Application program(s) 719 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 719 may include one or more algorithms that may be used to implement features of the disclosure.

The invention may be described in the context of computer-executable instructions, such as applications 719, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 701 and/or terminals 741 and 751 may also include various other components, such as a battery, speaker, and/or antennas (not shown). Components of computer system 701 may be linked by a system bus, wirelessly or by other suitable interconnections. Components of computer system 701 may be present on one or more circuit boards. In some embodiments, the components may be integrated into a single chip. The chip may be silicon-based.

Terminal 751 and/or terminal 741 may be portable devices such as a laptop, cell phone, Blackberry™, tablet, smartphone, or any other computing system for receiving, storing, transmitting and/or displaying relevant information. Terminal 751 and/or terminal 741 may be one or more user devices. Terminals 751 and 741 may be identical to computer 701 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 8:
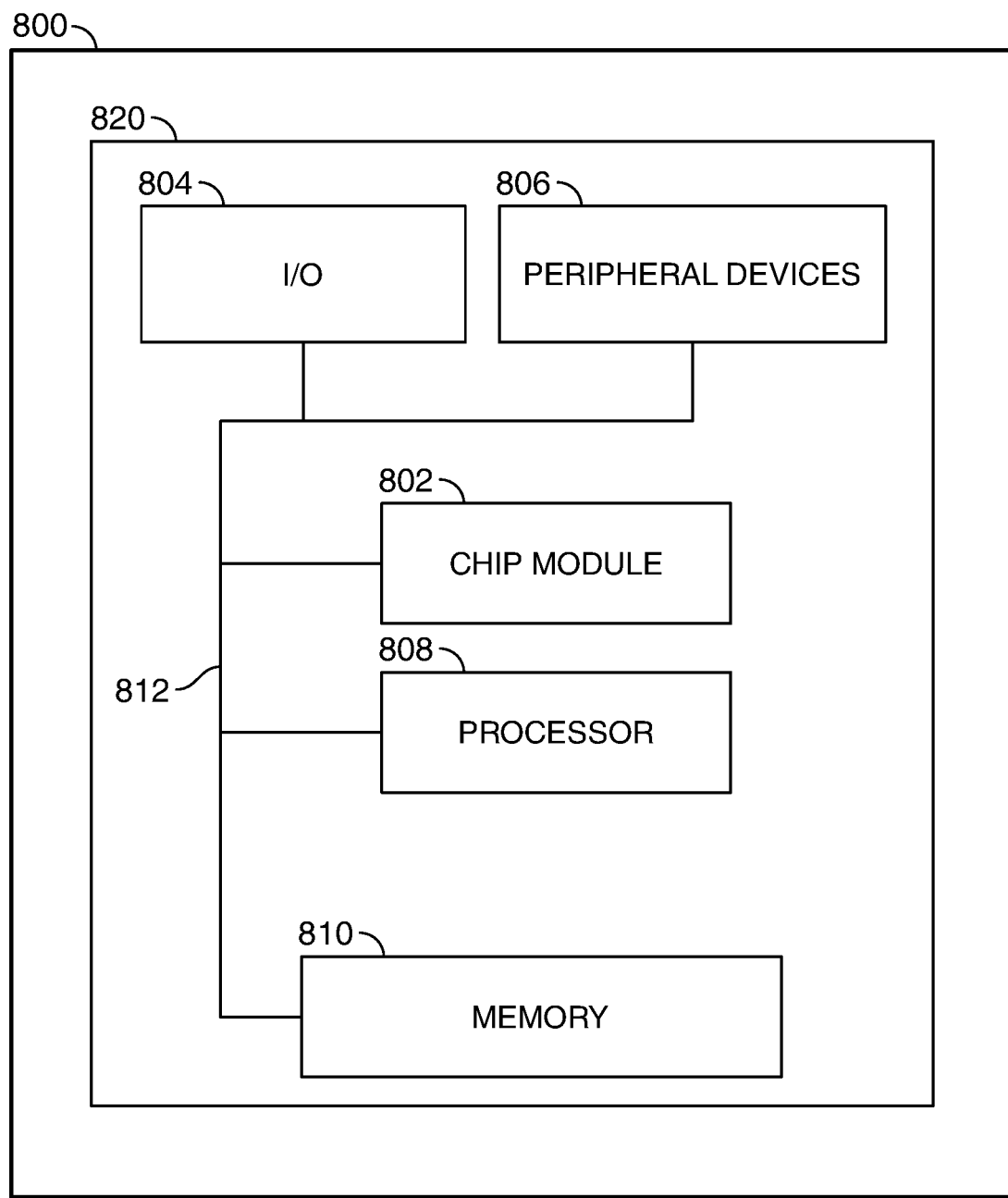
FIG. 8 shows an illustrative apparatus that may be configured in accordance with principles of the disclosure.

FIG. 8 shows illustrative apparatus 800 that may be configured in accordance with the principles of the disclosure. Apparatus 800 may be a computing device. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions, (which may be alternatively referred to herein as "computer instructions" or "computer code"), applications such as applications 719, signals, and/or any other suitable information or data structures.

Components 802, 804, 806, 808 and 810 may be coupled together by a system bus or other interconnections 812 and may be present on one or more circuit boards such as circuit board 820. In some embodiments, the components may be integrated into a single chip. The chip may be silicon-based.

Figure 9:
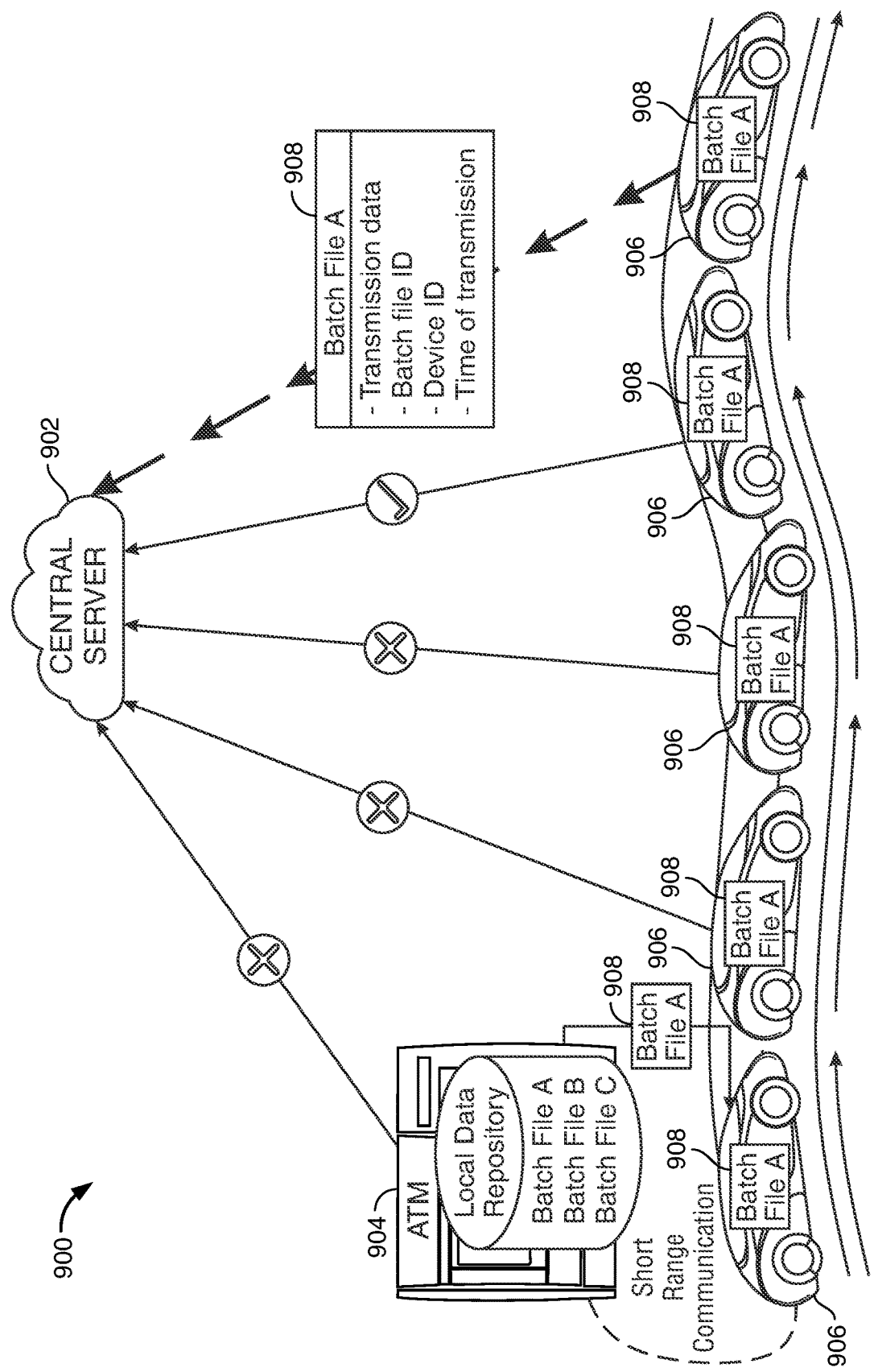
FIG. 9 shows an illustrative diagram in accordance with principles of the disclosure.

FIG. 9 shows an illustrative diagram 900 of a mobile device transporting transaction data from ATM 904 to the central server 902. ATM 904 may include a local data repository 910. Local data repository 910 may store one or more batch files that include transaction data that may not have been transmitted to the central server 902. These batch files may be stored locally because a network connection between ATM 904 and central server 902 may not be supported.

Mobile device 906 may be within a pre-determined range of the ATM that may enable the ATM to communicate with the mobile device via a short-range network communication. Electronic messages transmitted within short-range may be transmitted in the form of a Beacon signal, radio-waves or any other suitable method.

In this illustrative diagram 900, mobile device 906 is a smart car. It should be appreciated that mobile device 906 may not be limited to a smart car. Mobile device 906 may be any smart device enabled to receive, store and transmit data.

ATM 904 may detect mobile device 906 being within the pre-determined range and may attempt to electronically communicate with mobile device 906 in order to initiate a transaction transportation process that smart car 906 may be enabled to perform.

Following authorization of communication between ATM 904 and mobile device 906, ATM 904 may transmit batch file A 908 to mobile device 906. Smart car 906 may store batch file A 908 within memory of the mobile device 906. The communication and sharing of data between ATM 904 and smart car 906 may be enabled via short-range network communication.

Smart car 906 may depart from the pre-determined range of the ATM. As illustrated, smart car 906 may transmit signals on the road to attempt to establish a connection.

When smart car 906 is detected to be within an area where network connection between smart car 906 and central server 902 is supported, smart car 906 may establish the network connection.

It should be appreciated that the secure application running on the mobile device and associated with the entity of the ATM may be configured for detecting when network connection may be supported and initiate the establishment of the network connection.

At area 910, network connection is supported and smart car 908 may be enabled to successfully establish a network connection with central server 902. Batch file A 906 which is stored at smart car 908 may be transmitted to central server 902.

Batch file A 908 may include transaction data associated with one or more transactions performed at the ATM while network connection was not supported. Batch file A 908 may also include the batch file ID, device ID and a time of transmission of the batch file to central server 902.

Figure 10:
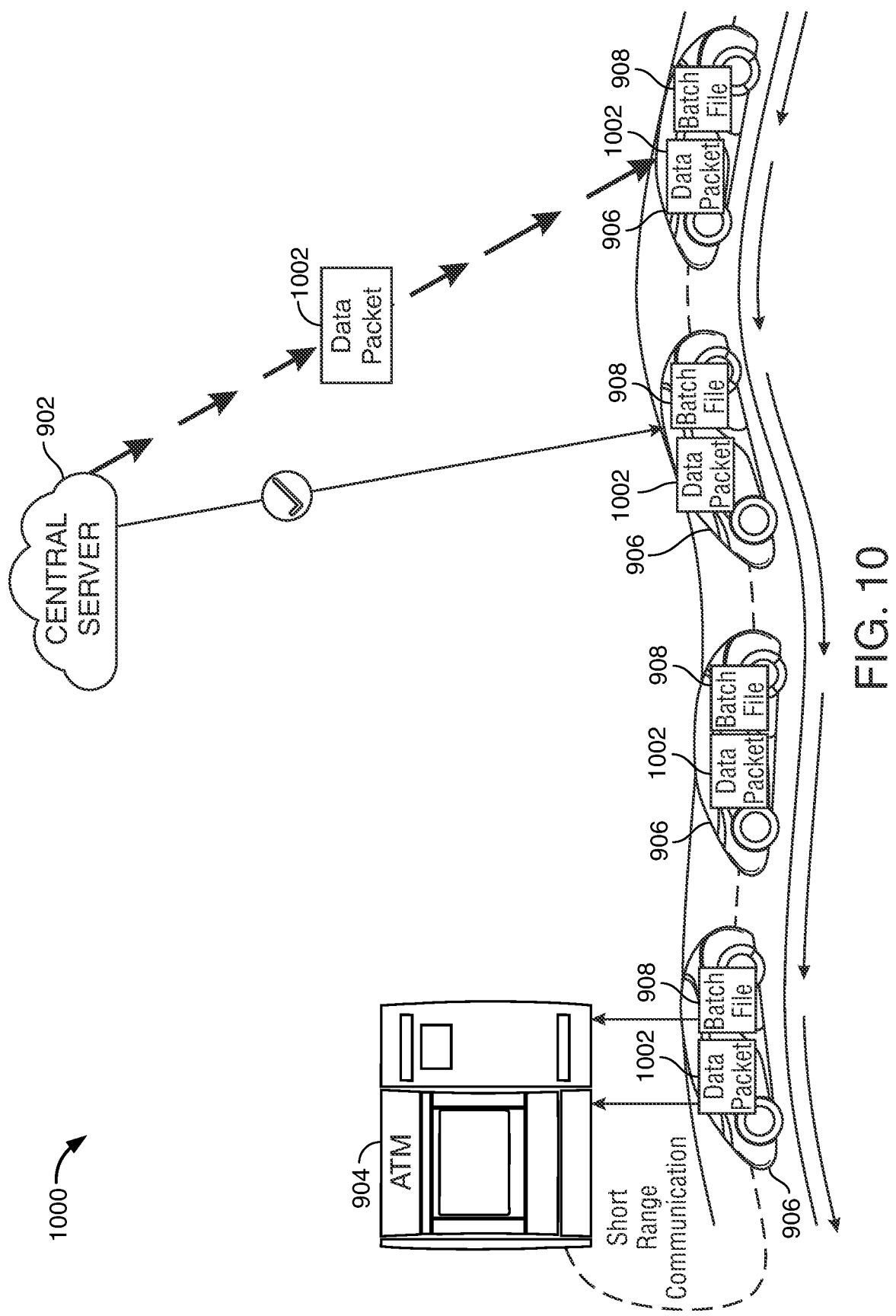
FIG. 10 shows an illustrative diagram in accordance with principles of the disclosure.

FIG. 10 shows another illustrative diagram 1000 of mobile device 906 returning to a location that is within the pre-determined range of ATM 904. Mobile device 906, in this illustrative diagram, is a smart car.

Following a transmittal of batch file 908 to the central server, as shown in FIG. 1, central server 902 may transmit a data packet 1002 to smart car 906. Data packet 1002 may be compiled at central server 902 following a processing of the transaction data included in batch file 908.

Data packet 1002 may include the batch file identifier of batch file 908, the device identifier of batch file 908, a timestamp of the transmission of the batch file to central server 902 and a status of the processing of the transaction data.

Smart car 906 may be configured to store data packet 1002 and batch file 908 within a local data storage at smart car 906.

In some embodiments, a user of smart car 906 may be aware that smart car 906 is operating as a transaction transportation intermediary. When the user is aware of this operation, the user may intentionally return smart car 906 to the ATM to enable updating the ATM of a completion of the transfer to the central server.

In some embodiments, the user may not be aware of the operation. The secure application may be in direct communication with the ATM. In this example, smart car 906 may store data packet 1002 and batch file 908 until smart car 906 is detected to be within the pre-determined range of the ATM. For example, smart car 906 may return to the ATM when the user needs to perform another transaction at the ATM. When smart car 906 returns to the ATM, which may be within the same day, week or any other suitable time, data packet 1002 and batch file 908 may automatically be transmitted to ATM 904.

Upon detection of smart car 906 within pre-determined range of ATM 904, smart car 906 may be enabled to connect with ATM 904 via a short-range communication and data packet 1002 may be transmitted to ATM 904. Data packet 1002 may be transmitted in order to update ATM 904 of the transmission of batch file 908 to central server 902.

ATM 904 may receive data packet 1002. ATM 904 may search the local data repository at the ATM for a copy of the batch file that corresponds to the data included in data packet 1002.

Data packet 1002 may include the device identifier and the batch file identifier of batch file 908. ATM may search the local data repository for the copy of the batch file that includes both the device identifier and the batch file identifier.

When the copy of the batch file that corresponds to the data packet 1002 is identified, ATM 904 may remove the copy of the batch file from a queue that is pending transmittal to central server 902.

Figure 11A:
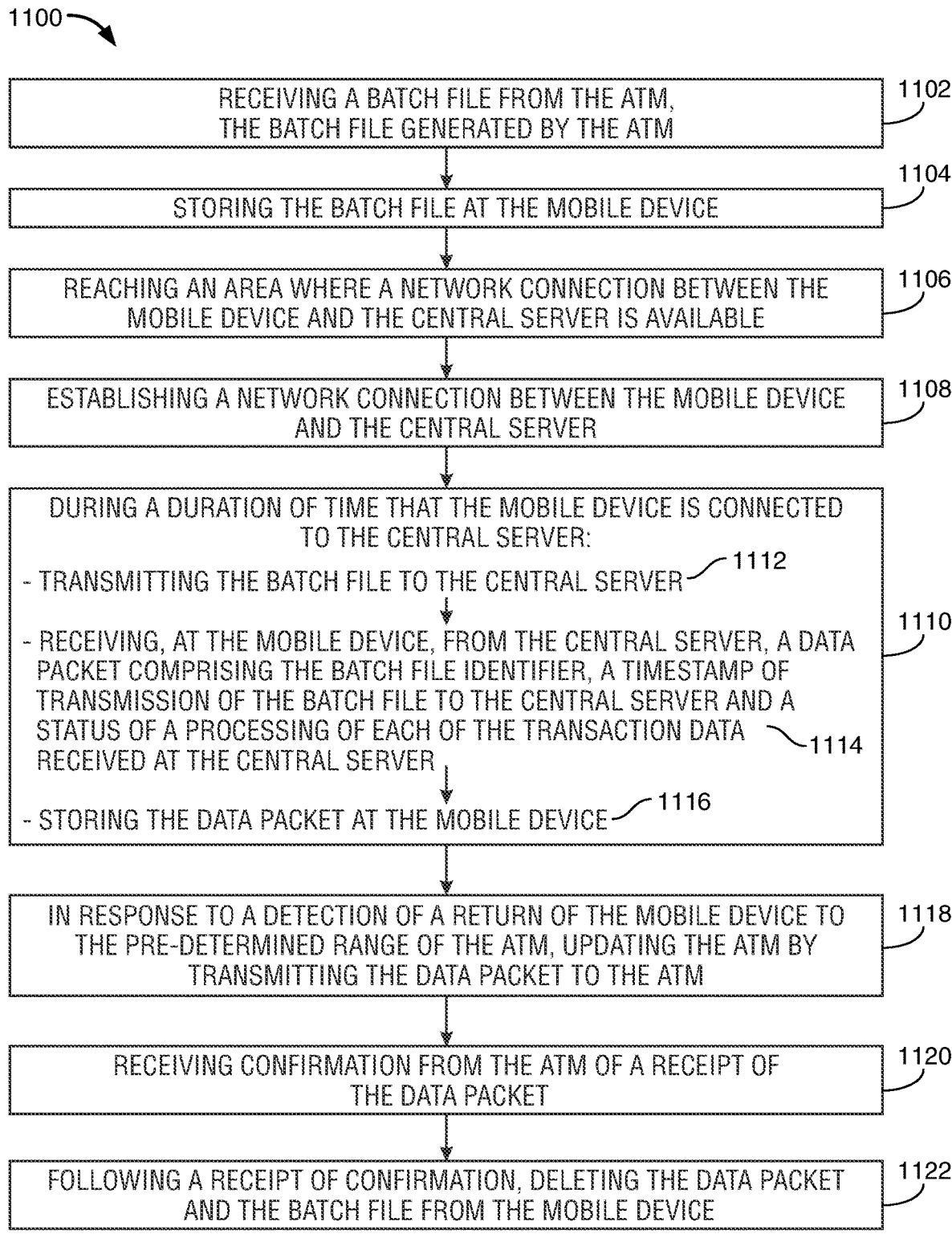
FIG. 11A shows an illustrative flow chart in accordance with principles of the disclosure.
Figure 11B:
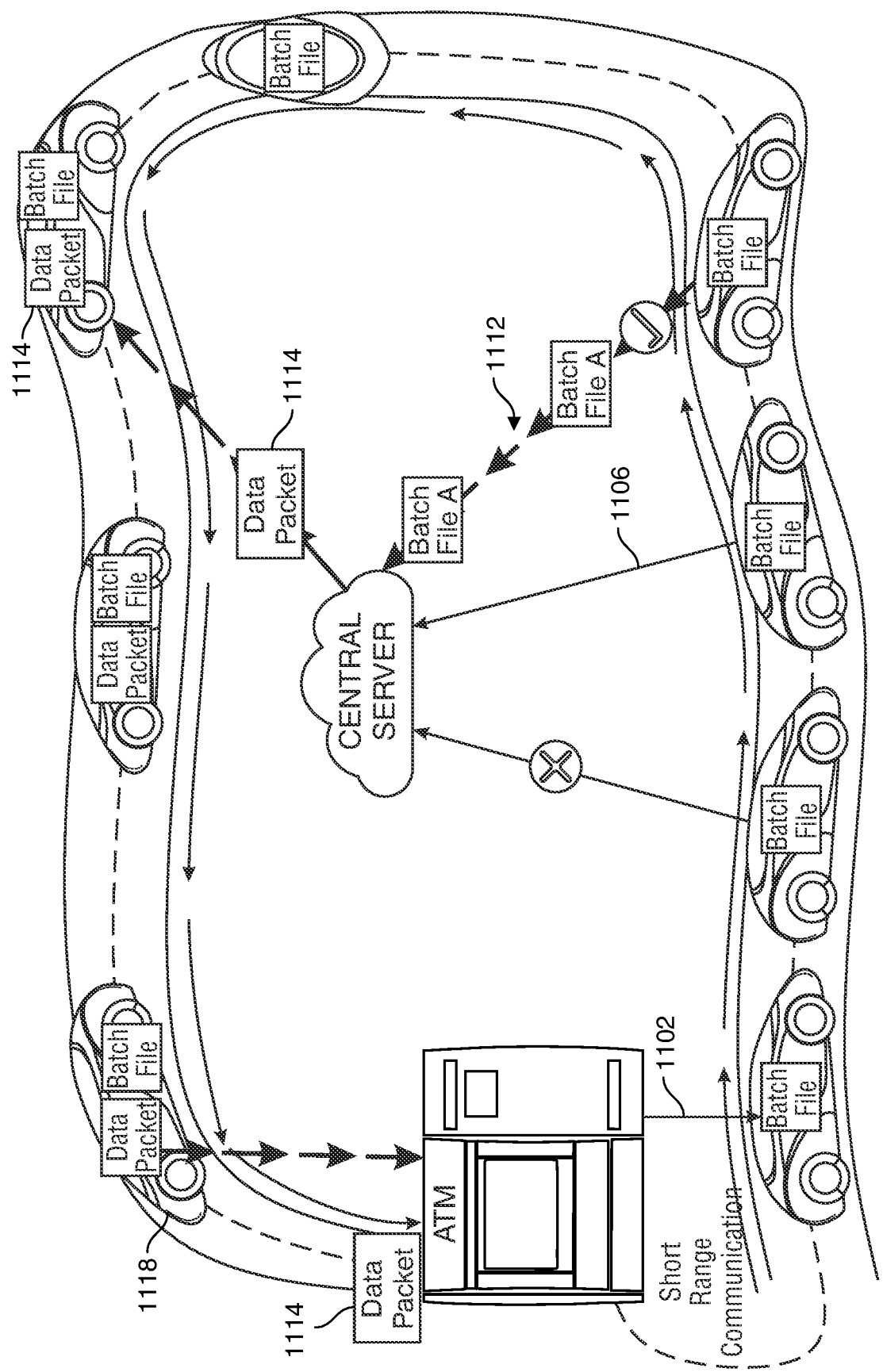
FIG. 11B shows an illustrative diagram in accordance with principles of the disclosure.

FIG. 11A shows an illustrative flow chart 1100 of steps performed at the mobile device. FIG. 11B shows a schematic diagram that corresponds to the steps described in flow chart 1100 of FIG. 11A.

At step 1102, the method may include receiving a batch file from the ATM that was generated by the ATM. Corresponding illustrations are shown at 1102 in FIG. 11B.

At step 1104, the method may include storing the batch file at the mobile device. Corresponding illustrations are shown at 1104 in FIG. 11B.

At step 1106, the method may include reaching an area where a network connection between the mobile device and the central server is available. Corresponding illustrations are shown at 1106 in FIG. 11B.

At step 1108, the method may include establishing the network connection between the mobile device and the central server. Corresponding illustrations are shown at 1108 in FIG. 11B.

At step 1110, the method may include, during a duration of time that the mobile device is connected to the central server, performing a plurality of steps. The first step may include transmitting the batch file to the central server, as shown at 1112. Corresponding illustrations are shown at 1112 in FIG. 11B.

The second step may include, during the duration of time, receiving at the mobile device, from the central server, a data packet, as shown at 1114. The data packet may include the batch file identifier and a timestamp of transmission of the batch file to the central server. The data packet may also include a status of a processing of each of the transaction data received at the central server. Corresponding illustrations are shown at 1114 in FIG. 11B.

The third step may include, following the receiving, at step 1116, the method may include storing the data packet at the mobile device. Corresponding illustrations are shown at 1116 in FIG. 11B.

At step 1118, in response to a detection of a return of the mobile device to the pre-determined range of the ATM, the method may include updating the ATM by transmitting the data packet to the ATM. Corresponding illustrations are shown at 1118 in FIG. 11B.

At step 1120, the method may include receiving confirmation from the ATM of a receival of the data packet.

At step 1122, the method may include, following a receipt of confirmation, deleting the data packet and the batch file from the mobile device.

Figure 12:
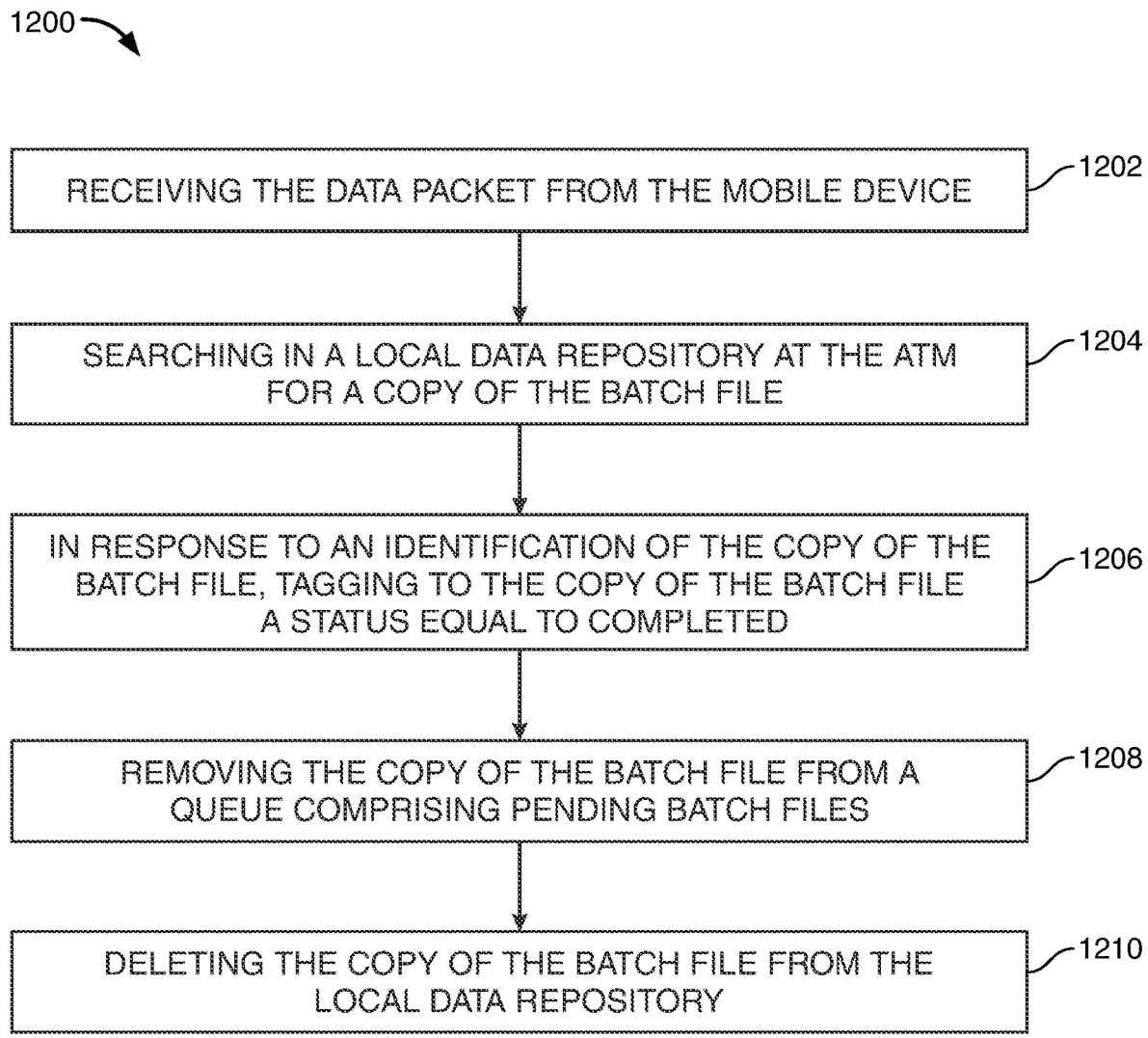
FIG. 12 shows an illustrative flow chart in accordance with principles of the disclosure.

FIG. 12 shows an illustrative flow chart 1200 of method steps performed by the ATM following a receival of the data packet described in FIG. 11.

At step 1202, the method may include receiving the data packet from the mobile device at the ATM.

At step 1204, the method may include searching in a local data repository at the ATM for a copy of the batch file.

At step 1206, the method may include, in response to an identification of the copy of the batch file, tagging to the copy of the batch file a status equal to completed.

At step 1208, the method may include removing the copy of the batch file from a queue comprising pending batch files.

At step 1210, the method may include deleting the copy of the batch file from the local data repository.

Thus, systems and methods for using one or more mobile devices for transporting information from ATM to a central server when the ATM does not support a network connection and, upon return of the one or more mobile devices to the ATM, updating the ATM is provided. Persons skilled in the art will appreciate that the present invention can be practiced by other than the described embodiments, which are presented for purposes of illustration rather than of limitation.

What is claimed:

1. A method using one or more mobile devices for transporting information from an automated teller machine ("ATM") to a central server when the ATM does not support a network connection and, upon return of the one or more mobile devices to the ATM, updating the ATM, the method comprising a processor on a mobile device executing the steps of:
   receiving a communication request from the ATM, via a short-range wireless communication, when the mobile device is within a pre-determined range of the ATM, the communication request comprising a request from the ATM to connect electronically with the mobile device;
   authenticating the communication request;
   confirming a first request from the ATM, the first request for determining whether a secure application associated with an entity of the ATM is running on the mobile device;
   when the mobile device does not have connection to the central server, receiving a second request from the ATM for approval to perform as a transaction transportation intermediary to transport electronic transaction data generated at the ATM to the central server, the transportation for being executed by the mobile device at a later point in time when the network connection to the central server is established;
   in response to an authorization of the second request, performing as the transaction transportation intermediary to transport the electronic transaction data generated at the ATM to the central server by:
      receiving a batch file generated by the ATM, the batch file comprising:
         transaction data associated with electronic transactions processed at the ATM while the network connection is not supported;
         a batch file identifier; and
         a device identifier associated with the mobile device;
      storing the batch file at the mobile device;
      at the later point in time, detecting that the network connection to the central server has become available;
      in response to the detecting, establishing the network connection with the central server;
      during a duration of time that the mobile device is connected to the central server:
         transmitting the batch file to the central server;
         receiving, from the central server, a data packet comprising the batch file identifier, a timestamp of transmission of the batch file to the central server and a status of a processing of each of the transaction data received at the central server; and
         storing the data packet at the mobile device; and
      in response to a detection of the ATM being within the pre-determined range to the mobile device, connecting to the ATM via the short-range wireless communication and, updating the ATM by:
         transmitting the data packet to the ATM;
         receiving confirmation from the ATM of a receival of the data packet; and
         following a receipt of the confirmation, deleting the data packet and the batch file from the mobile device.

2. The method of claim 1 further comprising the ATM performing the steps of:
   receiving the data packet from the mobile device;
   searching in a local data repository at the ATM for a copy of the batch file comprising the batch file identifier and the device identifier identified in the data packet; and
   in response to an identification of the copy of the batch file comprising the batch file identifier and the device identifier, tagging to the copy of the batch file, a status equal to completed.

3. The method of claim 2 further comprising the ATM performing the steps of:
   removing the copy of the batch file from a queue comprising batch files that are pending, the batch files generated while network connection has not been established at the ATM and are awaiting re-establishment of network connection to enable transporting to the central server.

4. The method of claim 3 further comprising the ATM performing the steps of, following the removing of the copy of the batch file from the queue, deleting the copy of the batch file from the local data repository.

5. The method of claim 1 wherein the performing as the transaction transportation intermediary comprises operating as a mediator for transporting electronic transaction data generated at the ATM to the central server when the ATM is not enabled to connect to the central server.

6. The method of claim 1 wherein the mobile device is one of a smart card, a smartphone, a smartwatch, a smart glasses and a smart car.

7. The method of claim 1 wherein the communication request is received from the ATM in response to a detection of a loss of the network connection between the ATM and the central server.

8. The method of claim 1 wherein the receiving of the request for approval to perform as the transaction transportation intermediary comprises:
   receiving a notification on a user interface ("UI") of the mobile device, the notification displaying a selectable option to accept or deny the request for approval.

9. The method of claim 1 wherein prior to storing the batch file at the mobile device, the method comprises:
   determining, by the mobile device, a size of the batch file;
   determining, by the mobile device, an amount of available storage at the mobile device;
   when the amount of available storage at the mobile device is equal to or greater than the size of the batch file, storing the batch file at the mobile device;
   when the amount of available storage at the mobile device is less than the size of the batch file, deleting the batch file from the mobile device; and
   transmitting to the ATM:
      a notification of insufficient storage space; and
      the amount of available storage at the mobile device.

10. The method of claim 9 further comprising the ATM performing the steps of splitting the batch file into a first partial batch file and a second partial batch file, wherein a size of the first partial batch file being no greater than the amount of available storage on the mobile device.

11. The method of claim 10 wherein the first partial batch file comprises a first portion of the transaction data from the batch file, a first partial batch file identifier and the device identifier.

12. The method of claim 11 further comprising:
receiving at the mobile device, the first partial batch file; and
receiving at an additional mobile device within the pre-determined range of the ATM, a second partial batch file, the second partial batch file comprising a remaining portion of the transaction data from the batch file, a second partial batch file identifier and a device identifier associated with the additional mobile device.

13. The method of claim 12 further comprising:
at the later point in time, detecting that the network connection to the central server has become available;
in response to the detecting, establishing the network connection between the mobile device and the central server;
during the duration of time that the mobile device is connected to the central server:
transmitting the first partial batch file to the central server;
receiving, at the mobile device, from the central server, a first data packet comprising the first partial batch file identifier, a timestamp of transmission of the first partial batch file to the central server and a status of a processing of each of the transaction data received at the central server; and
storing the first data packet at the mobile device; and
in response to the detection of the ATM being within the pre-determined range to the mobile device, connecting to the ATM via the short-range wireless communication and, updating the ATM by:
transmitting the first data packet to the ATM;
receiving confirmation from the ATM of a receival of the first data packet; and
following a receipt of confirmation, deleting the first data packet and the first partial batch file from the mobile device.

14. The method of claim 12 further comprising, for the additional mobile device:
at the later point in time, detecting that the network connection to the central server has become available;
in response to the detecting, establishing the network connection between the additional mobile device and the central server;
during the duration of time that the additional mobile device is connected to the central server:
transmitting the second partial batch file to the central server;
receiving, at the mobile device, from the central server, a second data packet comprising the second partial batch file identifier, a timestamp of transmission of the second partial batch file to the central server and a status of a processing of each of the transaction data received at the central server; and
storing the second data packet at the mobile device; and
in response to the detection of the ATM being within the pre-determined range to the mobile device, connecting to the ATM via the short-range wireless communication and updating the ATM by:
transmitting the second data packet to the ATM;
receiving confirmation from the ATM of a receival of the second data packet; and
following a receipt of confirmation, deleting the second data packet and the second partial batch file from the additional mobile device.

15. The method of claim 1 wherein the status of the processing of each of the transaction data received at the central server comprises one of:
a status of an execution of each of the transaction data;
a status of a storing of each of the transaction data;
a status of an account update associated with each of the transaction data; and
a status of a determination whether the batch file is a duplicate batch file already received from the ATM in an event that the ATM establishes the network connection.

16. A mobile device for transporting information from an automated teller machine ("ATM") to a central server when the ATM does not support a network connection and upon return of the mobile device to the ATM, updating the ATM, the mobile device comprising:
a secure application running on the mobile device, the secure application associated with an entity of the ATM;
a local data repository;
short-range wireless communication capabilities;
network connection capabilities; and
a user interface ("UI");
wherein:
when the mobile device is within a pre-determined range of the ATM and the network connection is not supported within the pre-determined range of the ATM, the mobile device is configured to perform as a transaction transportation intermediary for transporting electronic transaction data generated at the ATM, the transportation for being executed by the mobile device at a later point in time when a connection to the central server is established;
performing as the transaction transportation intermediary for transporting the electronic transaction data to the central server by:
receiving, from the ATM, a batch file, the batch file comprising transaction data associated with a plurality of transactions performed at the ATM while the network connection is not supported, a batch file identifier, and a device identifier associated with the mobile device; and
storing, the batch file at the mobile device pending transmittal to the central server;
at the later point in time, in response to the mobile device detecting the network connection being available is supported, the mobile device is configured to:
establish the network connection with the central server;
transmit the batch file to the central server;
following a receipt of the batch file at the central server, receive, from the central server, a data packet comprising the batch file identifier, a timestamp of transmission of the batch file to the central server and a status of an execution of each of the transaction data received at the central server; and
store the data packet at the mobile device; and
in response to a detection of the ATM being within the pre-determined range of the mobile device, following transmittal of the batch file to the central server, the mobile device is configured to:
transmit the data packet to the ATM;
receive confirmation from the ATM of a receival of the data packet; and following a receipt of confirmation, delete the data packet and the batch file from the mobile device.

17. The mobile device of claim 16 wherein the batch file is an encrypted batch file.

18. The mobile device of claim 16 wherein the mobile device is one of a smartphone, a smart glasses, a smart car and a smart card.

19. The mobile device of claim 16, wherein upon receipt of the batch file, the mobile device is configured to:
    determine a size of the batch file;
    determine an amount of available storage at the mobile device;
    when the amount of available storage at the mobile device is equal to or greater than the size of the batch file, store the batch file at the mobile device; and
    when the amount of available storage at the mobile device is less than the size of the batch file:
        delete the batch file from the mobile device; and
        transmit to the ATM a notification of insufficient storage space, and the amount of available storage at the mobile device.

20. The mobile device of claim 19 further comprising, the mobile device configured to:
    receive from the ATM, a first partial batch file, the first partial batch file being a size no greater than the amount of available storage at the mobile device; and
    store the first partial batch file at the mobile device pending an establishment of the network connection to the central server.

* * * * *